(12) United States Patent
Nomiyama et al.

(10) Patent No.: US 7,571,383 B2
(45) Date of Patent: Aug. 4, 2009

(54) DOCUMENT DATA RETRIEVAL AND REPORTING

(75) Inventors: Hiroshi Nomiyama, Kawasaki (JP); Daisuke Takuma, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 11/180,328

(22) Filed: Jul. 13, 2005

(65) Prior Publication Data
US 2006/0015486 A1 Jan. 19, 2006

(30) Foreign Application Priority Data
Jul. 13, 2004 (JP) ............... 2004-206567

(51) Int. Cl.
G06F 17/30 (2006.01)
G06F 7/00 (2006.01)

(52) U.S. Cl. ............... 715/260; 707/3; 707/4; 707/5

(58) Field of Classification Search ............ 707/3; 715/260
See application file for complete search history.

(56) References Cited

U.S. PATENT DOCUMENTS

| | | | | |
|---|---|---|---|---|
| 5,418,948 A | * | 5/1995 | Turtle | 707/4 |
| 5,488,725 A | * | 1/1996 | Turtle et al. | 707/5 |
| 5,794,237 A | * | 8/1998 | Gore, Jr. | 707/5 |
| 5,819,258 A | * | 10/1998 | Vaithyanathan et al. | 707/2 |
| 5,857,179 A | * | 1/1999 | Vaithyanathan et al. | 707/2 |
| 6,006,221 A | * | 12/1999 | Liddy et al. | 707/5 |
| 6,078,913 A | * | 6/2000 | Aoki et al. | 707/2 |
| 6,098,066 A | * | 8/2000 | Snow et al. | 707/3 |
| 6,269,368 B1 | * | 7/2001 | Diamond | 707/6 |
| 6,513,032 B1 | * | 1/2003 | Sutter | 707/3 |
| 6,847,966 B1 | * | 1/2005 | Sommer et al. | 707/5 |
| 6,993,525 B1 | * | 1/2006 | Imago | 707/10 |
| 7,162,465 B2 | * | 1/2007 | Jenssen et al. | 707/1 |
| 2002/0059161 A1 | * | 5/2002 | Li | 707/1 |

(Continued)

OTHER PUBLICATIONS

Toshiaki Fujiki, Tomoyuki Minamino, Yasuhiro Suzuki, Manabu Okumra Discovery of Burst in Document Stream' Study Report from Information Processing Society of Japan, 2004-NL-1 p. 85-92.

(Continued)

*Primary Examiner*—William L Bashore
*Assistant Examiner*—Ashraf Zahr
(74) *Attorney, Agent, or Firm*—Michael J. Buchenhorner; Vazken Alexanian

(57) ABSTRACT

Enables retrieving document data appropriately reflecting content of a retrieval statement and detecting problems in sequentially added document data. A retrieval system retrieves document data having content specified by an inputted retrieval statement among a plurality of document data, including: document database storing the plurality of document data, concept database storing a plurality of concepts using a hierarchical structure; document data concept extraction extracting document concepts based on keywords contained in respective document data, the concepts being concepts corresponding to the document data; retrieval statement concept extraction extracting a retrieval statement concept based on a keyword contained in the retrieval statement; a concept retrieving section retrieving concepts wherein the retrieval statement concept is a higher or lower layer of the document concept among the plurality of document data, retrieval result output section outputting document data retrieved, as the document data containing content specified by the retrieval statement.

21 Claims, 13 Drawing Sheets

U.S. PATENT DOCUMENTS

| | | | | |
|---|---|---|---|---|
| 2002/0073095 | A1* | 6/2002 | Ohga | 707/102 |
| 2002/0169762 | A1* | 11/2002 | Cardona | 707/3 |
| 2003/0037050 | A1* | 2/2003 | Monteverde | 707/6 |
| 2003/0225773 | A1* | 12/2003 | Jenssen et al. | 707/100 |
| 2004/0064447 | A1* | 4/2004 | Simske et al. | 707/5 |
| 2005/0159909 | A1* | 7/2005 | Lin | 702/83 |

OTHER PUBLICATIONS

Kenji Yamanishi Text Mining and NLP Business [online], NEC, [retrieved on Jun. 30, 2004], Internet<URL: it.jeita.or.jp/eltech/committee/knowledge/PDF/2003/Yamanishi.pdf.

Nomura Research Institute What is True Teller [online] [retrieved on Jun. 30, 2004], Internet www.trueteller.net/about/index.shtml.

Justsystem [Alize], [online], [retrieved on Jun. 30, 2004], Internet www.justsystem.com.jp.km.ssm.

Justsystem What is Concept Base Technology [online] www.justsystem.co.jp/km/whats/search.q.104.html.

NRI. Services (NRI Cyber Patent) [online] [retrieved on Jun. 30, 2004] Internet www.patent.ne.jp./01gaiyo/s-point/06.html.

Sasaki at al. Learning Type Question and Answer System SAIQA-II Using SVM, Journal from Information Processing Society of Japan vol. 45, No. 02, 2004.

Matsumura at al Evaluation of Information Retrieving Technique Using Modifying Relationships among Words, Journal from 'Information Processing Society of Japan vol. 41, No. SIG01-003, 2000.

T. Nesukawa and T. Nageno Text analysis and knowledge mining system' IBM Systems Journal vol. 40, No. 4, 2001.

Autonomy Conceptual Search [online] [retrieved on Jun. 30, 2004] Internet www.autonomy.com/c/content/Products/IDOL/f/Conceptual_Search >.

T. Fawcett and F. Provost, Activity monitoring—Noticing interesting changes in behavior' In Proc. Fifth ACM SIGKDD International Conference on Knowledge Discovery and Data Mining, pp. 53-62. 1999.

Jon Kleinberg "Bursty and hierarchical structure in streams" In Proc. The 8th ACM SIGKDD International Conference on Knowledge Discovery and Data Mining 2002.

* cited by examiner

Figure 6

```
IF {
    word0 = "Turn off"
    word00 = "Power supply"
}
THEN {
    word0 = "Power-off"
}
```

Figure 7

```
IF {
    word0 = "Recognize", hitei = "1"
        word00 = "Hard disk"
}
THEN {
    concept0 = "/Problem/hardware/hard disk "
}
```

1110 — 
| Type | Series A model A3 | | Retrieval |
|---|---|---|---|
| Retrieval statement | No hard disk recognized. | | |

Series A model A3 replaced with Series A for generalization

1130 —
| Operator | Frequency | Frequency graph | Operation | Concept | |
|---|---|---|---|---|---|
| AND | * | | Delete | /product/PC product/notebook/series A | Higher concept |
| AND | 5 | | Delete | /defect/hardware/hard disk | Higher concept |

1160 —
| Date | Call type | Problem type | Response | Title |
|---|---|---|---|---|
| 20040310 | Within guarantee period | Hardware defect | Arrange repairs | ... |
| 20040205 | Guidance | Guidance | Inform inquirer of service center | ... |
| | | | | |

DOCUMENT DATA RETRIEVAL AND REPORTING

FIELD OF THE INVENTION

The present invention relates to a document data retrieval system, a retrieval method, a reporting system, a reporting method, and a program. In particular, the present invention relates to a retrieval system, a retrieval method, a reporting system, a reporting method, and a program all of which retrieve one or more of a plurality of document data and which report that the number of document data having a particular concept has increased.

BACKGROUND ART

As a retrieval system that retrieves document data which have a content specified by an inputted retrieval statement among multiple document data, retrieval systems have been studied which retrieve appropriate documents reflecting the intention of the retrieval even if the document data do not completely contain the retrieval statement. Such a retrieval system can be utilized by, for example, a manufacturer of certain products, as a basic technique for a support system. In this case, the system enables the manufacturer to create a call log database containing inquiries at a call center about products and replies to the inquiries as document data in text form so as to appropriately reply to inquiries utilizing the database (see Non-patent Document 5).

The following documents are considered:

[Patent Document 1] Published Unexamined Patent Application No. 11-259524

[Patent Document 2] Japanese Patent No. 3266586

[Non-Patent Document 1] JUSTSYSTEM, "What is ConceptBase" Technology, [online], Jul. 30, 2003, JUSTSYSTEM, [retrieved on Jun. 30, 2004], Internet <URL: http://www.justsystem.co.jp/km/whats/search_q_ 104.html>

[Non-Patent Document 2] NRI, "Services (NRI Cyber Patent)", [online], [retrieved on Jun. 30, 2004], Internet <URL: http://www.patent.ne.jp/01gaiyo/s-point/ 06.html>

[Non-Patent Document 3] Sasaki et al., "Learning Type Question and Answer System SAIQA-II Using SVM", Journal from Information Processing Society of Japan, Vol. 45, No. 02, 2004

[Non-Patent Document 4] Matsumura et al., "Evaluation of Information Retrieving Technique Using Modifying Relationships among Words", Journal from Information Processing Society of Japan, Vol. 41, No. SIG01-003, 2000

[Non-Patent Document 5] T. Nasukawa and T. Nagano, "Text analysis and knowledge mining system", IBM Systems Journal, Vol. 40, No. 4, 2001

[Non-Patent Document 6] Autonomy, "Conceptual Search", [online], [retrieved on Jun. 30, 2004], Internet <URL:http://www.autonomy.com/c/content/Products/ IDOL/f/Conceptual_Search>

[Non-Patent Document 7] T. Fawcett and F. Provost, "Activity monitoring: Noticing interesting changes in behavior.", In Proc. Fifth ACM SIGKDD International Conference on Knowledge Discovery and Data Mining, pages 53-62, 1999

[Non-Document 8] Jon Kleinberg, "Bursty and hierarchical structure in streams", In Proc. The 8th ACM SIGKDD International Conference on Knowledge Discovery and Data Mining, 2002

[Non-Patent Document 9] Toshiaki FUJIKI, Tomoyuki MINAMINO, Yasuhiro SUZUKI, Manabu OKUMURA, "Discovery of Burst in Document Stream", Study Report from Information Processing Society of Japan, 2004-NL-160, p. 85-92

[Non-Patent Document 10] Kenji YAMANISHI, "Text Mining and NLP Business], [online], NEC, [retrieved on Jun. 30, 2004], Internet <URL:http://it.jeita.or.jp/eltech/ committee/knowledge/PDF/2003/Yamanishi.pdf

[Non-Patent Document 11] Nomura Research Institute, "What is True Teller?", [online], [retrieved on Jun. 30, 2004], Internet <URL:http://www.trueteller.net/about/ index.shtml>

[Non-Patent Document 12] JUSTSYSTEM, [Alize], [online], [retrieved on Jun. 30, 2004], Internet<URL:http:// www.justsystem.co.jp/km/ssm>

By way of example, a retrieval system has been proposed which considers ambiguity in extracting a keyword of a content word from retrieval statement used for retrieval or from document data (see Non-patent Documents 1, 2, and 6). Further, a retrieval system has been proposed in which meanings expressed by function words are incorporated as keywords in order to achieve more accurate retrievals (see Non-patent Document 5). Moreover, a retrieval system has been proposed which does not only determine whether or not a keyword is contained in a retrieval statement or document data but also considers the relationship between words (see Non-patent Documents 4 and Patent Documents 1 and 2). Furthermore, a proposed system that outputs an answer to a question is capable of learning on the basis of examples of correct answers to questions (see Non-patent Document 3).

Further, it is important to businesses to establish trustworthy relations with clients and improve the quality of products and client support. Thus, the businesses are desired to discover problems with products or services early. As means for discovering such problems, call logs at a call center are expected to be utilized.

Non-patent Document 7 proposes a method of sensing problems in sequentially accumulated information. Further, as an example of this method, a system has been proposed which senses a problem by finding a portion of a document stream which has a smaller input interval between documents relating to a particular keyword (see Non-patent Document 8). The following have also been proposed: a system considering the number of writes per unit time in finding the above portion (see Non-patent Document 9), a system giving an alarm if the number of occurrences of a particular top exceeds a threshold (see Non-patent Document 10), and a system that senses an increase in the frequency of a keyword to extract a suddenly emerging topic (see Non-patent Document 11). Furthermore, a system has been proposed which executes predictive analysis using examples of known defects in products or the like.

Problems to be solved by the invention include:

In theses fields, a staff member receiving the call desirably inputs the contents of the inquiry as a retrieval statement to efficiently retrieve document data on the basis of the retrieval intention.

With a retrieval system taking ambiguity into account in keyword extraction, if only content words are used as keywords, then for example, the words "hard disk" and "recognize" are extracted from the retrieval statement "no hard disk is recognized". As a result, the retrieval intention of "not recognized" is lost, and even document data containing "is recognized" are retrieved.

Further, if function words are taken into account as keywords, then the words "hard disk" and "not recognized"

are extracted from the retrieval statement "no hard disk is recognized". Consequently, the retrieval intention of "not recognized" is reflected. However, the retrieval is carried out on the basis of whether or not the specified keyword appears in documents. As a result, document data containing the concept "CD-ROMs cannot be recognized but hard disks are recognized".

Even if dependencies among words are taken into consideration, it is difficult to match various expression forms expressing the retrieval intension, for example, "no hard disk can be recognized" and "no hard disk is visible". This is because even if the words are extended within the scope of synonyms to analyze the meaning of the retrieval statement, it is impossible to appropriately identify expressions (combinations of words) such as "no hard disk is visible" which are used only in particular situations.

Moreover, if call logs at the call center are utilized as means for discovering problems, word-based processing can utilize few words expressing the individual problems. Accordingly, it is difficult to classify the problems. Further, it is impossible to determine what problems are occurring on the basis of keywords reported to have an increased frequency. Furthermore, for new products, the number of calls tends to increase for all the problems. In such a situation, it is difficult to discover a particular problem early.

SUMMARY OF THE INVENTION

It is thus a general aspect of the present invention to provide a retrieval system, a retrieval method, a reporting system, a reporting method, and a program all of which solves the above problems. This object is achieved by a combination of the characteristics described in this invention specification.

According to a first aspect of the present invention, there is provided a retrieval system that retrieves document data which have a content specified by an inputted retrieval statement among a plurality of document data. An example of a system includes a document database that stores the plurality of document data, a concept database that stores a plurality of pre-specified concepts using a hierarchical structure in which a first concept including a second concept is a higher layer of the first concept, a document data concept extracting section that extracts document concepts on the basis of keywords contained in the respective document data, the document concepts being the concepts corresponding to the document data, a retrieval statement concept extracting section that extracts a retrieval statement concept on the basis of a keyword contained in the retrieval statement, the retrieval statement concept being the concept corresponding to the retrieval statement, a concept retrieving section that retrieves document data in which the retrieval statement concept is a higher or lower layer of the document concept among the plurality of document data, and a retrieval result output section that outputs the document data retrieved by the concept retrieving section, as the document data containing the content specified by the retrieval statement, as well as a retrieval method, a program, and a recording medium all of which relate to the retrieval system.

According to a second aspect of the present invention, there is provided a reporting system comprising a document database that sequentially stores inputted document data, a concept database that stores a plurality of prespecified concepts using a hierarchical structure in which a first concept including a second concept is a higher layer of the first concept, a document data concept extracting section that extracts document concepts on the basis of keywords contained in the respective document data, the document concepts being the concepts corresponding to the document data, a concept ratio calculating section that calculates a ratio of the number of the document data corresponding to each of the concepts to the number of the document data in the document database, a relative frequency calculating section that calculates a relative frequency indicating the magnitude of the ratio calculated by the concept ratio calculating section with respect to a reference ratio corresponding to each of the concepts, a frequent concept selecting section that selects the concepts in which the relative frequency is at least a prespecified threshold among said plurality of concepts, a preferred concept selecting section that selects one of a first concept selected by the frequent concept selection section and a second concept corresponding to a higher layer of the first concept, on the basis of the relative frequencies of the first and second concepts, and a reporting section that reports to a user that the concept of the first concept or the second concept selected by the preferred concept selecting section has a higher relative frequency.

The above summary of the invention does not enumerate all the required characteristics of the present invention. Sub-combinations of these groups of characteristics may constitute an invention. Advantages of the invention include that with the invention one can retrieve document data appropriately reflecting the content of a retrieval statement and properly detect problems in sequentially added document data.

BRIEF DESCRIPTION OF THE DRAWINGS

For a more complete understanding of the present invention and the advantages thereof, reference is now made to the following description taken in conjunction with the accompanying drawings, in which:

FIG. 6 is a diagram showing an example of a normalization rule stored in a synonym DB 115 according to the embodiment of the present invention;

FIG. 7 is a diagram showing an example of a concept extraction rule stored in a concept extraction rule DB 125 according to the embodiment of the present invention;

FIG. 11 is a diagram showing an example of a display screen 1100 of the retrieval system 10 according to the embodiment of the present invention;

DESCRIPTION OF SYMBOLS

Figure 1:
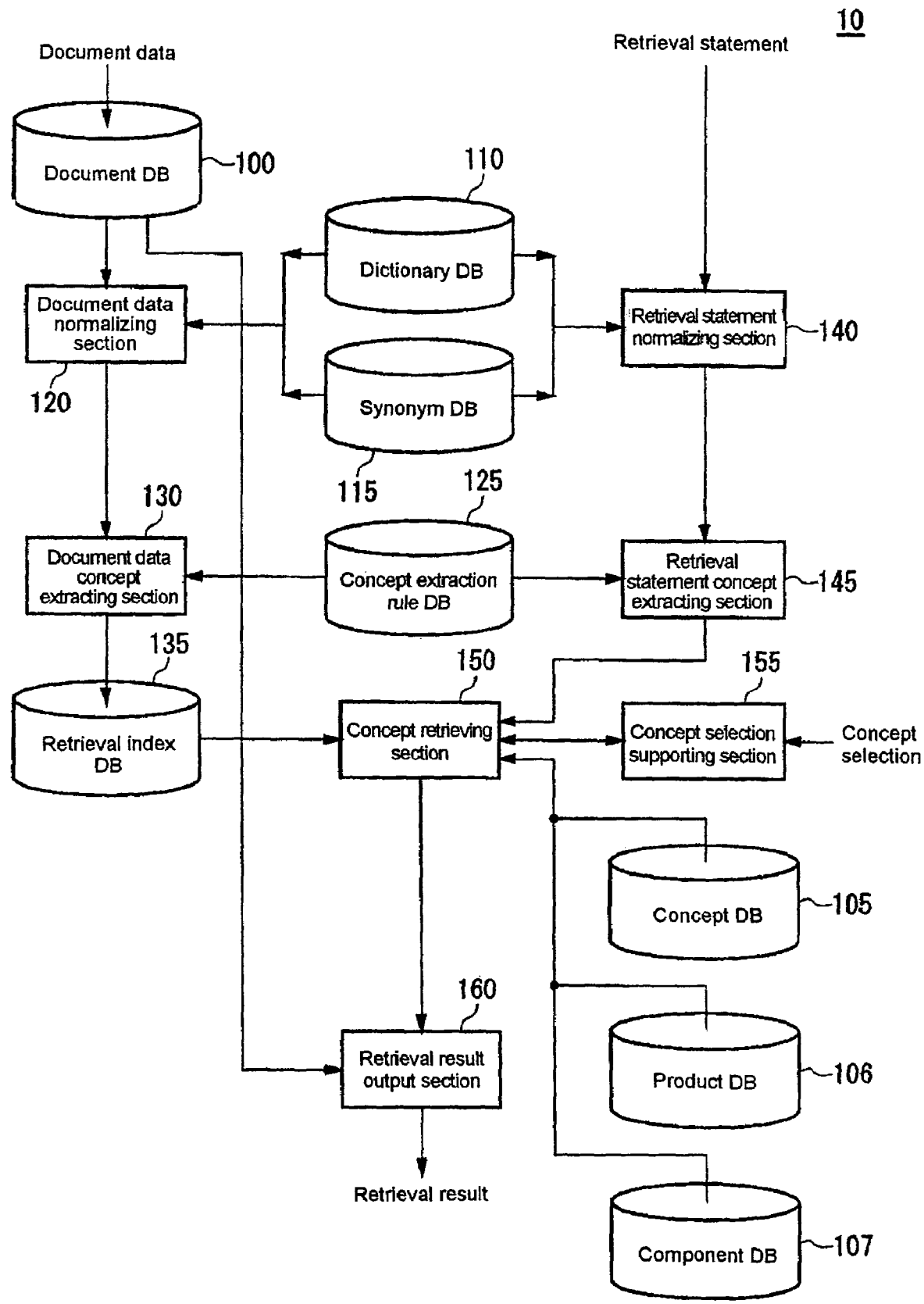
FIG. 1 is a diagram showing the configuration of a retrieval system 10 according to an embodiment of the present invention.

10 . . . Retrieval system
20 . . . Reporting system
100 . . . Document DB
105 . . . Concept DB
106 . . . Product DB
107 . . . Component DB
110 . . . Dictionary DB
115 . . . Synonym DB
120 . . . Document data normalizing section
125 . . . Concept extraction rule DB
130 . . . Document data concept extracting section
135 . . . Retrieval index DB
140 . . . Retrieval statement normalizing section
145 . . . Retrieval statement concept extracting section
150 . . . Concept retrieving section
155 . . . Concept selection supporting section
160 . . . Retrieval result output section
800 . . . Same concept output section
810 . . . Higher concept acquiring section
820 . . . Generalized concept output section
830 . . . Lower concept acquiring section
840 . . . Specialized concept output section
1100 . . . Display screen
1110 . . . Retrieval statement input screen
1130 . . . Concept operation screen
1160 . . . Retrieval result output screen
1200 . . . Concept ratio calculating section
1203 . . . All-product concept ratio calculating section
1206 . . . Particular-product concept ratio calculating section
1210 . . . Relative frequency calculating section
1220 . . . Frequent concept selecting section
1230 . . . Preferred concept selecting section
1240 . . . Reference frequency calculating section
1250 . . . Reporting section
1900 . . . Computer
2000 . . . CPU
2010 . . . ROM
2020 . . . RAM
2030 . . . Communication interface
2040 . . . Hard disk drive
2050 . . . Flexible disk drive
2060 . . . CD-ROM drive
2070 . . . I/O chip
2075 . . . Graphic controller
2080 . . . Display device
2082 . . . Host controller
2084 . . . I/O controller
2090 . . . Flexible disk
2095 . . . CD-ROM

DISCRIPTION OF THE INVENTION

The present invention provides retrieval systems, retrieval methods, reporting systems, reporting methods, and programs which solve the above mentioned problems. These are achieved by a combination of the characteristics described in this invention specification.

In an example embodiment of the present invention, there is provided a retrieval system that retrieves document data which have a content specified by an inputted retrieval statement among a plurality of document data. The system includes: a document database that stores the plurality of document data; a concept database that stores a plurality of prespecified concepts using a hierarchical structure in which a first concept including a second concept is a higher layer of the first concept; a document data concept extracting section that extracts document concepts on the basis of keywords contained in the respective document data, the document concepts being the concepts corresponding to the document data; a retrieval statement concept extracting section that extracts a retrieval statement concept on the basis of a keyword contained in the retrieval statement, the retrieval statement concept being the concept corresponding to the retrieval statement; a concept retrieving section that retrieves document data in which the retrieval statement concept is a higher or lower layer of the document concept among the plurality of document data; and a retrieval result output section that outputs the document data retrieved by the concept retrieving section, as the document data containing the content specified by the retrieval statement, as well as a retrieval method, a program, and a recording medium all of which relate to the retrieval system.

In another example embodiment of the present invention, there is provided a reporting system which includes: a document database that sequentially stores inputted document data, a concept database that stores a plurality of prespecified concepts using a hierarchical structure in which a first concept including a second concept is a higher layer of the first concept; a document data concept extracting section that extracts document concepts on the basis of keywords contained in the respective document data, the document concepts being the concepts corresponding to the document data; a concept ratio calculating section that calculates a ratio of the number of the document data corresponding to each of the concepts to the number of the document data in the document database, a relative frequency calculating section that calculates a relative frequency indicating the magnitude of the ratio calculated by the concept ratio calculating section with respect to a reference ratio corresponding to each of the concepts; a frequent concept selecting section that selects the concepts in which the relative frequency is at least a prespecified threshold among said plurality of concepts; a preferred concept selecting section that selects one of a first concept selected by the frequent concept selection section and a second concept corresponding to a higher layer of the first concept, on the basis of the relative frequencies of the first and second concepts; and a reporting section that reports to a user that the concept of the first concept or the second concept selected by the preferred concept selecting section has a higher relative frequency.

The above description does not enumerate all the characteristics of the present invention. Subcombinations of these groups of characteristics may constitute an invention. An advantage of the invention includes that with the present invention one can retrieve document data appropriately reflecting the content of a retrieval statement and properly detect problems in sequentially added document data.

The present invention will be described below through particular representative embodiments. However, the embodiments below are not intended to limit the invention. Further, not all the combinations of characteristics described in the embodiments are essential to the solution of the present invention.

FIG. 1 shows the configuration of a retrieval system 10 according to an embodiment of the present invention. The retrieval system 10 appropriately retrieves document data containing a content specified by a retrieval statement inputted by a user or the like. According to the present embodiment, the retrieval system 10 retrieves document data obtained by documenting inquiries about products which are sent to a call center and responses to the inquiries The retrieval system 10 comprises a document DB 100, a concept DB 105 (concept database), a product DB 106 (product database), a component DB 107 (component database), a dictionary DB 110 (dictionary database), a synonym DB 115 (synonym database), a document data normalizing section 120, a concept extraction rule DB 125, a document data concept extracting section 130, a retrieval index DB 135 (retrieval index database), a retrieval statement normalizing section 140, a retrieval statement concept extracting section 145, a concept retrieving section 150, a concept selection supporting section 155, and a retrieval result output section 160.

The document DB 100 stores a plurality of document data. According to the present embodiment, the document DB 100 stores document data including, for example, the contents of inquiries about products from users and responses to the inquiries, the document data indicating the contents of each of a plurality of defects in products. The document data are sequentially stored every time an inquiry and the corresponding response are made.

The concept DB 105 uses a hierarchical structure in which a first concept including a second concept is a higher layer of the first concept, to store a plurality of prespecified concepts. Here the concept is individual pieces of information predefined by a manufacturer or user of the retrieval system 10 and into which the meanings of sentences handled by the retrieval system 10 are systematically classified. The concept DB 105 according to the present embodiment stores a plurality of concepts identifying a plurality of defects in products.

The product DB 106 uses a hierarchical structure to store inclusive relationships among the names of a plurality of products. The component DB 107 uses a hierarchical structure to store inclusive relationships among the components of the products. The dictionary DB 110 stores a dictionary describing the types and normal expressions of words. The synonym DB 115 stores associations between prespecified words or phrases and keywords that are synonyms of these words or phrases.

The document data normalizing section 120 uses the dictionary DB 110 to carry out morphological and syntactic analyses of each of the documents data stored in the document DB 100. The document data normalizing section 120 normalizes each document data by using the synonym DB 115 to replace a word or phrase contained in the document data with a keyword that is a synonym of the word.

The concept extraction rule DB 125 stores concept extraction rules including sets each of one or more keywords and a concept indicating the meanings of the one or more keywords. The document data concept extracting section 130 extracts a document concept corresponding to each document data on the basis of a keyword contained in the document data. The document data concept extracting section 130 according to the present embodiment applies the concept extraction rules stored in the concept extraction rule DB 125 to the one or more keywords contained in the document data, thus converting the one or more keywords into a concept corresponding to the keywords. The retrieval index DB 135 stores, for each document data, the association between the document data and the document concept for the document data extracted by the document data concept extracting section 130.

The retrieval statement normalizing section 140 carries out a morphological and syntactic analyses of retrieval statements in the same manner as that used by the document data normalizing section 120. On the basis of a keyword contained in the retrieval statement, the retrieval statement concept extracting section 145 extracts a retrieval statement concept corresponding to the retrieval statement in the same manner as that used by the document data normalizing section 120.

The concept retrieving section 150 uses the retrieval index DB 135 to retrieve one of a plurality of document data which has the document concept corresponding to the retrieval statement concept. In this case, the concept retrieving section 150 retrieves, from each of the plurality of document data, document data whose retrieval statement concept is a higher or lower layer of the document concept. On the basis of an instruction from the user of the retrieval system 10, the concept selection supporting section 155 supports the setting of the retrieval statement concept as a higher and/or lower concept.

The retrieval result outputting section 160 outputs document data retrieved by the concept retrieving section 150, as document including the content specified by the retrieval statement.

With the retrieval system 10, shown above, the prespecified hierarchical structure can be used to systematically define the inclusive relationships among concepts. Then, document data can be retrieved taking the inclusive relationship between a retrieval statement concept and a document concept into account. This makes it possible to appropriately map a retrieval statement and document data to carry out a retrieval appropriately reflecting the contents of the retrieval statement.

Figure 2:
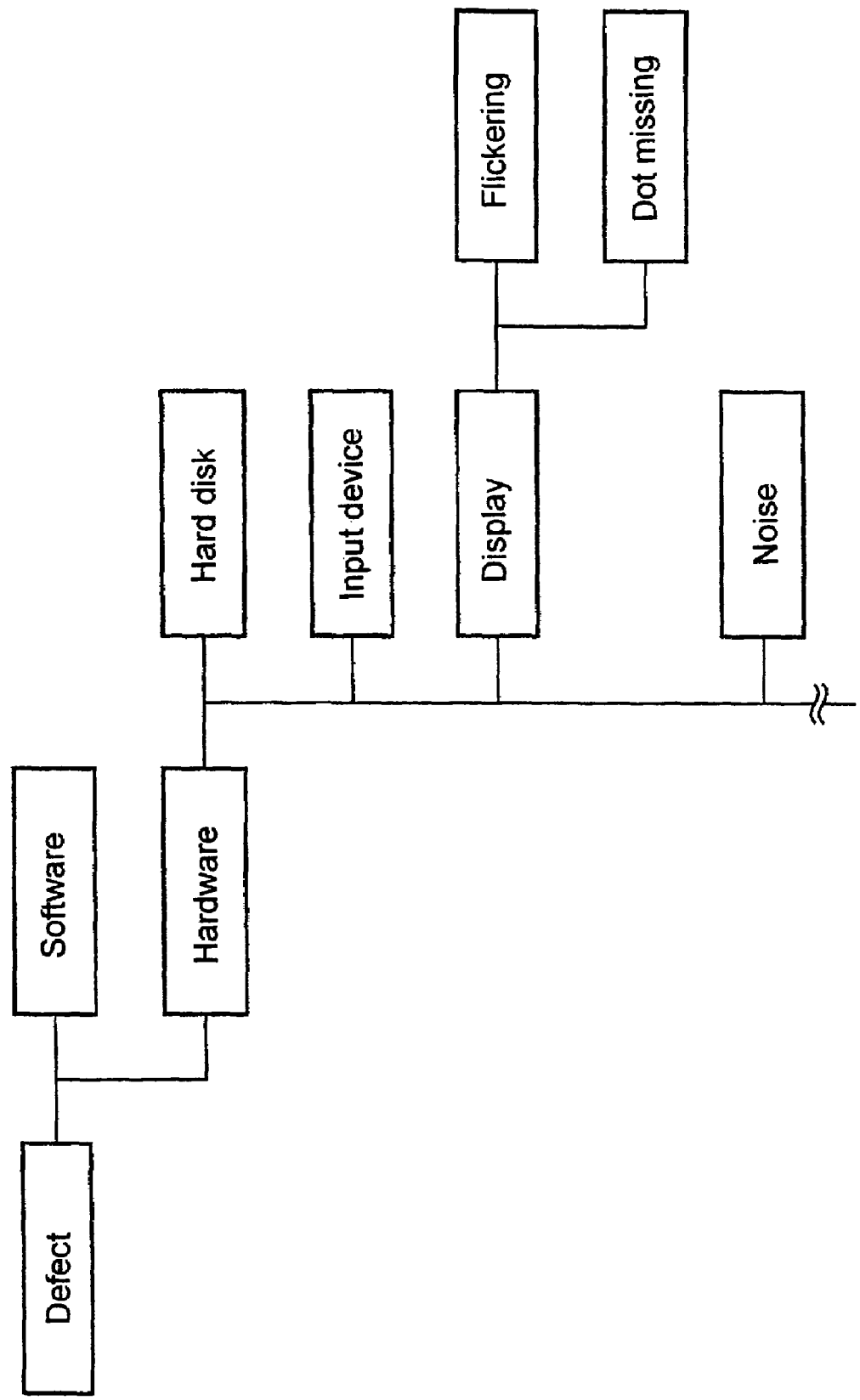
FIG. 2 is a diagram showing an example of a defect concept hierarchy stored in a concept DB 105 according to the embodiment of the present invention.

FIG. 2 shows an example of a defect concept hierarchy stored in the concept DB 105 according to the embodiment of the present invention. By way of example, the concept DB 105 according to the present embodiment stores a hierarchical structure in which a higher layer corresponds to concepts identifying certain objects or components and in which a lower layer corresponds to concepts describing the states or the like of the objects or components.

The defect concept hierarchy uses a hierarchical structure in which a first concept semantically including a second concept is a higher layer of the first concept, to systematize concepts identifying possible defects in products. For example, the node "hardware" in the hierarchical structure in FIG. 2 is a concept having the meaning "there is a defect in hardware". The node "hardware" is represented as "/defect/hardware". Additionally, "hard disk" is a concept having the meaning "there is a defect in a hard disk that is (a part of) the hardware". The "hard disk" is represented as "/defect/hardware/hard disk".

According to the present embodiment, a concept in the lower layer is semantically included by a concept in the higher layer of the concept in the lower layer. For example, "/defect/hardware/hard disk" that is a concept indicating that "there is a defect in the hard disk that is (a part of the) hardware" is a form of "/defect/hardware" that is a concept indicating "there is a defect in the hardware". These concepts have an inclusive relationship in which the concept in the higher layer is established if the concept in the lower layer is established. Similarly, "/defect/hardware/display/flickering" that is a concept indicating that "there is a defect in the hardware in which a display that is (a part of the) hardware is flickering" is a form of "/defect/hardware/display" that is a concept indicating that "there is a defect in the display that is (a part of the) hardware" and is included in the higher concept.

Further, according to the present embodiment, the concept DB 105 stores a plurality of concepts using a hierarchical structure in which the lower layer of a concept (for example, "defect/hardware") indicating that there is a defect in a component of a product is a concept (for example, "defect/hardware/noise") indicating the state of the defect in the component or a concept (for example, "defect/hardware/hard disk") indicating a component that is a part of the component.

Figure 3:
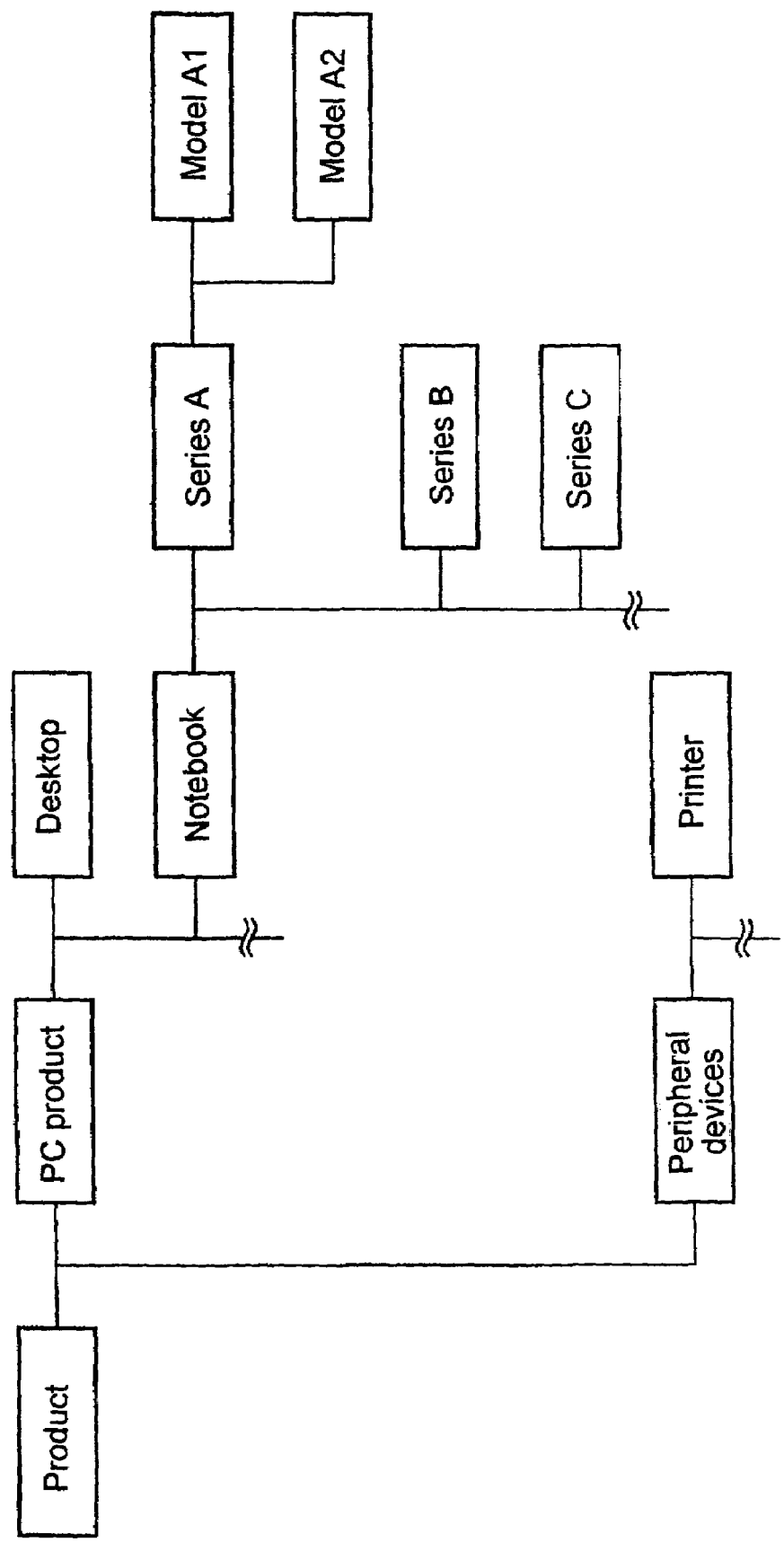
FIG. 3 is a diagram showing an example of a product concept hierarchy stored in a product DB 106 according to the embodiment of the present invention.

FIG. 3 shows an example of a product concept hierarchy stored in the product DB 106 according to the embodiment of the present invention. The product concept hierarchy uses a hierarchical structure to systematize inclusive relationships among concepts indicating the names of a plurality of products. According to the present embodiment, a hierarchical structure is used in which a first concept including a second concept is a higher layer of the first concept, as in the case of the defect concept hierarchy. For example, "/product/PC product/notebook/series A" is a concept indicating a general product name including "/product/PC product/notebook/series A/model A1" and "/product/PC product/notebook/series A/model A2".

The product concept hierarchy shown above may be stored in the concept DB 105 as a hierarchical structure different from that for defects. In this case, the concept DB 105 stores each of the plurality of concepts as one of the nodes of a plurality of different hierarchical structures (a first hierarchical structure, a second hierarchical structure, . . . ).

Figure 4:
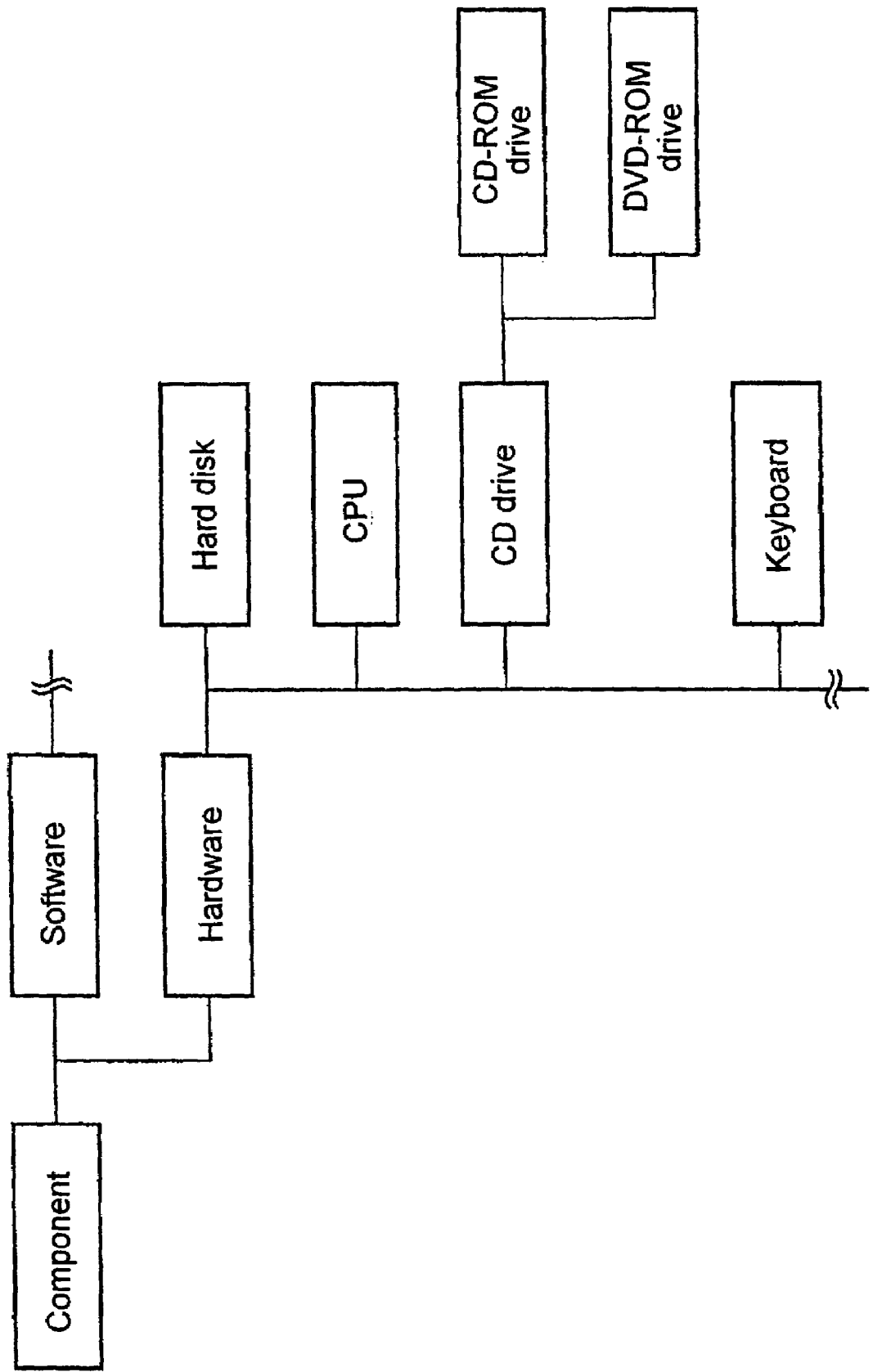
FIG. 4 is a diagram showing an example of a component concept hierarchy stored in a component DB 107 according to the embodiment of the present invention.

FIG. 4 shows an example of a component concept hierarchy stored in the component DB 107 according to the embodiment of the present invention. The component concept hierarchy uses a hierarchical structure to systematize inclusive relationships among concepts indicating components constituting products. According to the present embodiment, a hierarchical structure is used in which a first concept semantically including a second concept is a higher layer of the first concept, as in the case of the defect concept hierarchy. For example, "component/hardware" is a concept indicating components including "component/hardware/hard disk", "component/hardware/CPU", "component/hardware/CD drive", and "component/hardware/keyboard".

The component concept hierarchy shown below may be stored in the concept DB 105 as a hierarchical structure different from that for defects.

Figure 5:
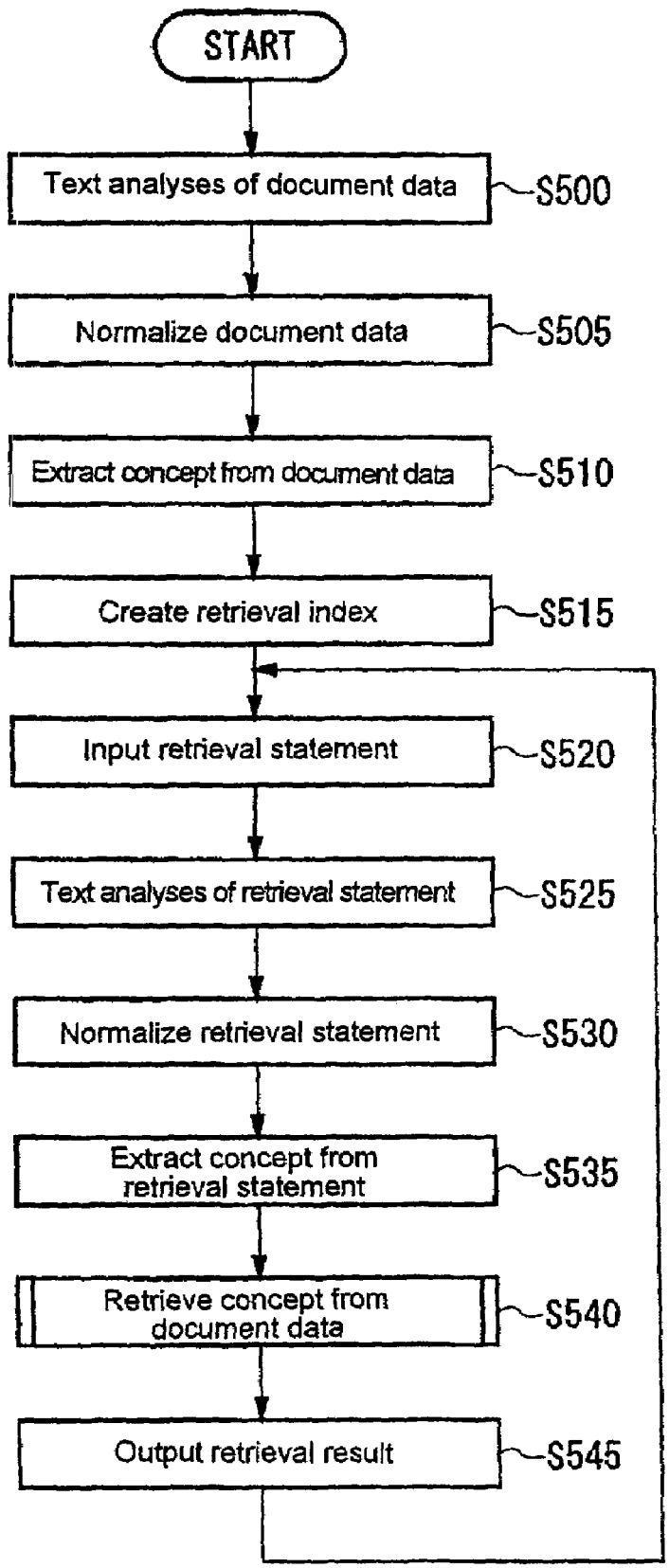
FIG. 5 is a flowchart showing an operation flow of the retrieval system 10 according to the embodiment of the present invention.

FIG. 5 shows an operation flow of the retrieval system 10 according to the embodiment of the present invention.

First, the document data normalizing section 120 uses the dictionary DB 110 to carry out text analyses of each document data stored in the document DB 100 such as a morphological and syntactic analyses (S500). Then, the document data normalizing section 120 normalizes the document data by replacing a word or phrase extracted as a result of the text analyses with a keyword corresponding to the word or phrase (S505). In this case, if the dictionary contains a registered concept uniquely defined in association with the word or phrase, this concept is used to carry out normalization.

Then, the document data concept extracting section 130 extracts the concept of the document data (document concept) on the basis of the keyword contained in each document data (S510). If the concept DB 105 stores a plurality of hierarchical structures for concepts, the document data concept extracting section 130 extracts, for the document data, a document concept belonging to each of the hierarchical structures. That is, for example, if the concept DB 105 stores each concept as a node of the first or second hierarchical structure, the document data concept extracting section 130 may extract, for each document data, a first document concept belonging to the first hierarchical structure and a second document concept belonging to the second hierarchical structure. Alternatively, on the basis of the keyword contained in the document data, the document data concept extracting section 130 may further extract a document concept indicating a product name described in the document data and/or a document concept indicating a component described in the document data. Then, the document data concept extracting section 130 adds the document concept of each document data to information indicating the document data to create a retrieval index. The document data concept extracting section 130 then stores the retrieval index in the retrieval index DB 135 (S515).

When a retrieval statement is inputted (S520), the retrieval statement normalizing section 140 carries out text analyses of the retrieval statement in the same manner as the document data normalizing section 120 (S525). Then, the retrieval statement normalizing section 140 normalizes the retrieval statement by replacing a word or phrase contained in the retrieval statement with a keyword that is a synonym of the word or phrase (S530).

Then, the retrieval statement concept extracting section 145 retrieves a retrieval statement concept from the retrieval statement in the same manner as the document data concept extracting section 130 (S535). According to the present embodiment, the retrieval statement concept extracting section 145 extracts a retrieval statement concept corresponding to a retrieval statement inputted by the user in S520 and used to retrieve a defect in the product. Further, on the basis of the keyword contained in the retrieval statement, the retrieval statement concept extracting section 145 may further extract a document concept indicating a product name described in the retrieval statement and/or a document concept indicating a component described in the retrieval statement.

Then, the concept retrieving section 150 retrieves the concept of the document data on the basis of the retrieval concept extracted from the retrieval statement and the document concept extracted from the document data (S540). More specifically, if the document concept is the same as the retrieval statement concept or belongs to a higher or lower layer of the retrieval statement concept, the concept retrieving section 150 selects the document data as one corresponding to the retrieval statement. In this case, if the retrieval concept is a higher or lower layer of the document concept stored in the retrieval index DB 135 before the retrieval statement is inputted, the concept retrieving section 150 outputs the document data corresponding to the document concept as a retrieval result. This enables the concept retrieving section 150 to carry out retrieval on the basis of the document concept already extracted. The retrieval can be carried out faster than in the case in which a document concept is extracted from each document data for each retrieval.

Then, the retrieval result output section 160 outputs the document data retrieved by the concept retrieving section 150, as a retrieval result (S545). The retrieval result output section 160 according to the present embodiment outputs the document data retrieved by the concept retrieving section 150, as document data indicating the contents of defects in the product inputted by the user.

Then, upon receiving the input of the next retrieval statement, the retrieval system 10 advances the process to S520. If new document data is added to the document DB 100, the retrieval system 10 advances the process to S500. The retrieval system 10 thus extracts a document concept from the document data and stores it in the retrieval index DB 135.

With the retrieval system 10 shown above, the prespecified hierarchical structure can be used to systematically define the inclusive relationships among the concepts. Then, the document data can be retrieved taking the inclusive relationship between the retrieval statement concept and the document concept into account. It is thus possible to appropriately map the retrieval statement and document data to the concept to carry out a retrieval appropriately reflecting the contents of the retrieval statement. This function is particularly effective if limited types of concepts are accurately defined so as to be adequately retrievable, for example, if inquiries about products and corresponding responses are stored in a database so as to deal with new inquiries.

FIG. 6 shows an example of a normalization rule stored in the synonym DB 115 according to the embodiment of the present invention. The synonym DB 115 stores the normalization rule illustrated in FIG. 6 in order to normalize the retrieval statement and the document data. The normalization rule in FIG. 6 normalizes the phrase "turn off" in the expression "turn off a power supply" by replacing the phrase with the keyword "power-off", which is a synonym of the phrase. If syntactic analysis of the document data or retrieval statement results in the detection of an expression containing the "power supply" as the subject and "is turned off" as the predicate, the document data normalizing section 120 and the retrieval statement normalizing section 140 replaces it with "is powered-off". Further, the document data normalizing section 120 and the retrieval statement normalizing section 140 may carry out normalizations of expressions such as replacements of "get mad" with "get angry" and "get enraged" with "get very angry" on the basis of the normalization rules instead of simple replacements of words or phrases. Then, the document data concept extracting section 130 extracts a document concept from the normalized document data. The retrieval statement concept extracting section 145 extracts a retrieval statement concept from the normalized retrieval statement. By thus normalizing synonyms at a word or phrase level before concept retrieval, it is possible to increase the accuracy at which the document data corresponding to the retrieval statement is retrieved.

FIG. 7 shows an example of a concept extraction rule stored in the concept extraction rule DB 125 according to the embodiment of the present invention. The concept extraction rule DB 125 stores the concept extraction rule illustrated in FIG. 7 in order to predefine a concept to be extracted from the retrieval statement and document data. In this case, the concept extraction rule converts one or more keywords in a syntax tree into a concept indicating the meaning of the one or more keywords on the basis of the syntax (dependency relationship or the like) of a sentence obtained by text analyses. In FIG. 7, the specified rule extracts the concept "/defect/hardware/hard disk" on the basis of the keywords "hard disk" and "recognize", which can be extracted from the sentence "no hard disk can be recognized", and the dependency relationship of "recognize" which is "negation" (hitei="1").

If the document data include the one or more keywords contained in any of the concept extraction rules stored in the concept extraction rule DB 125, the document data concept extracting section 130 extracts a concept contained in the concept extraction rule, as a document concept. Similarly, if the retrieval statement includes the one or more keywords contained in any of the concept extraction rules stored in the concept extraction rule DB 125, the retrieval statement concept extracting section 145 extracts a concept contained in the concept extraction rule, as a retrieval statement concept.

In the above description, in addition to the keywords, dependencies, and attributes, generic words such as a "problem" and a "request" may be used to define a concept extraction rule so that the document data concept extracting section 130 and the retrieval statement concept extracting section 145 can extract a concept. For example, the document data concept extracting section 130 and the retrieval statement concept extracting section 145 may extract the concept "/defect/hardware/hard disk" from a "problem with the hard disk".

Alternatively, the concept extraction rule DB 125 may store not only the concept hierarchy for defects but also concept extraction rules for a concept hierarchy for products or components.

With the above process, the document data concept extracting section 130 and the retrieval statement concept extracting section 145 can extract the three concepts "defect/hardware/hard disk", "product/PC product/notebook/series A/model A1", and "component/hardware/hard disk" from the sentence "the notebook computer, series A, model A1 does not recognize any hard disk".

Thus, the retrieval system 10 according to the present embodiment can predefine concepts corresponding to one or more keywords and the modificatory relationships among the keywords. This makes it possible to appropriately convert a sentence in a natural language into a concept systematized in accordance with the application of the retrieval system 10.

Figure 8:
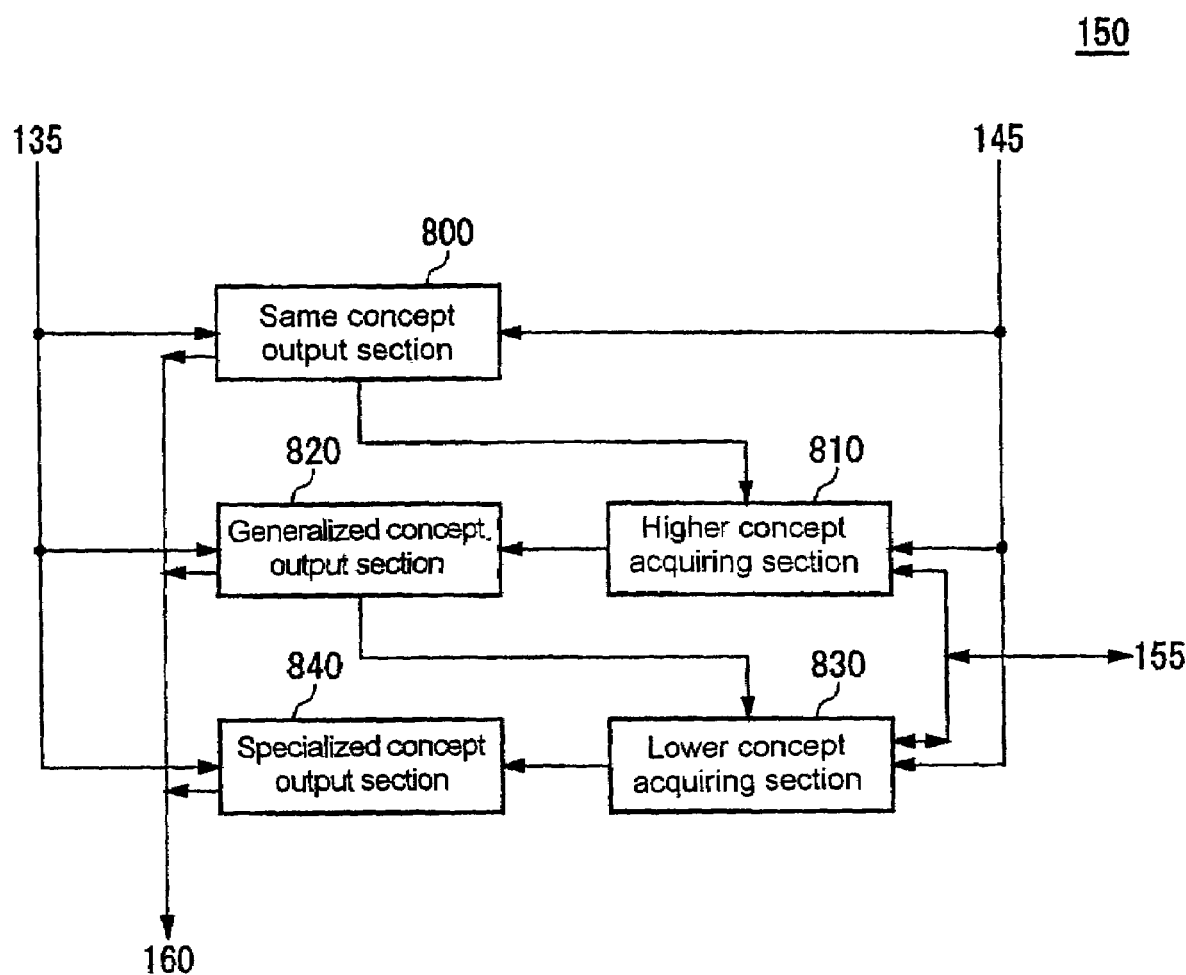
FIG. 8 is a diagram showing the configuration of a concept retrieving section 150 according to the embodiment of the present invention.

FIG. 8 shows the configuration of the concept retrieving section 150 according to the embodiment of the present invention. The concept retrieving section 150 has a same concept output section 800, a higher concept acquiring section 810, a generalized concept output section 820, a lower concept acquiring section 830, and a specialized concept output section 840.

If the retrieval statement concept matches the document concept and the retrieval statement concept is not specialized, the same concept output section 800 outputs the document data to the retrieval result output section 160 as a retrieval result. If the retrieval statement concept does not match the document concept, the higher concept acquiring section 810 acquires a retrieval statement higher concept that is a higher layer of the retrieval statement concept. If the retrieval statement higher concept matches the document concept, the generalized concept output section 820 outputs the document data as a retrieval result. If the same document data can be retrieved even after the retrieval statement concept has been converted into a retrieval statement lower concept that is a lower layer of the retrieval statement concept, the lower concept acquiring section 830 replaces the retrieval statement concept with the retrieval statement lower concept. The specialized concept output section 840 outputs document data for which the retrieval statement lower concept matches the document concept, as a retrieval result.

Figure 9:
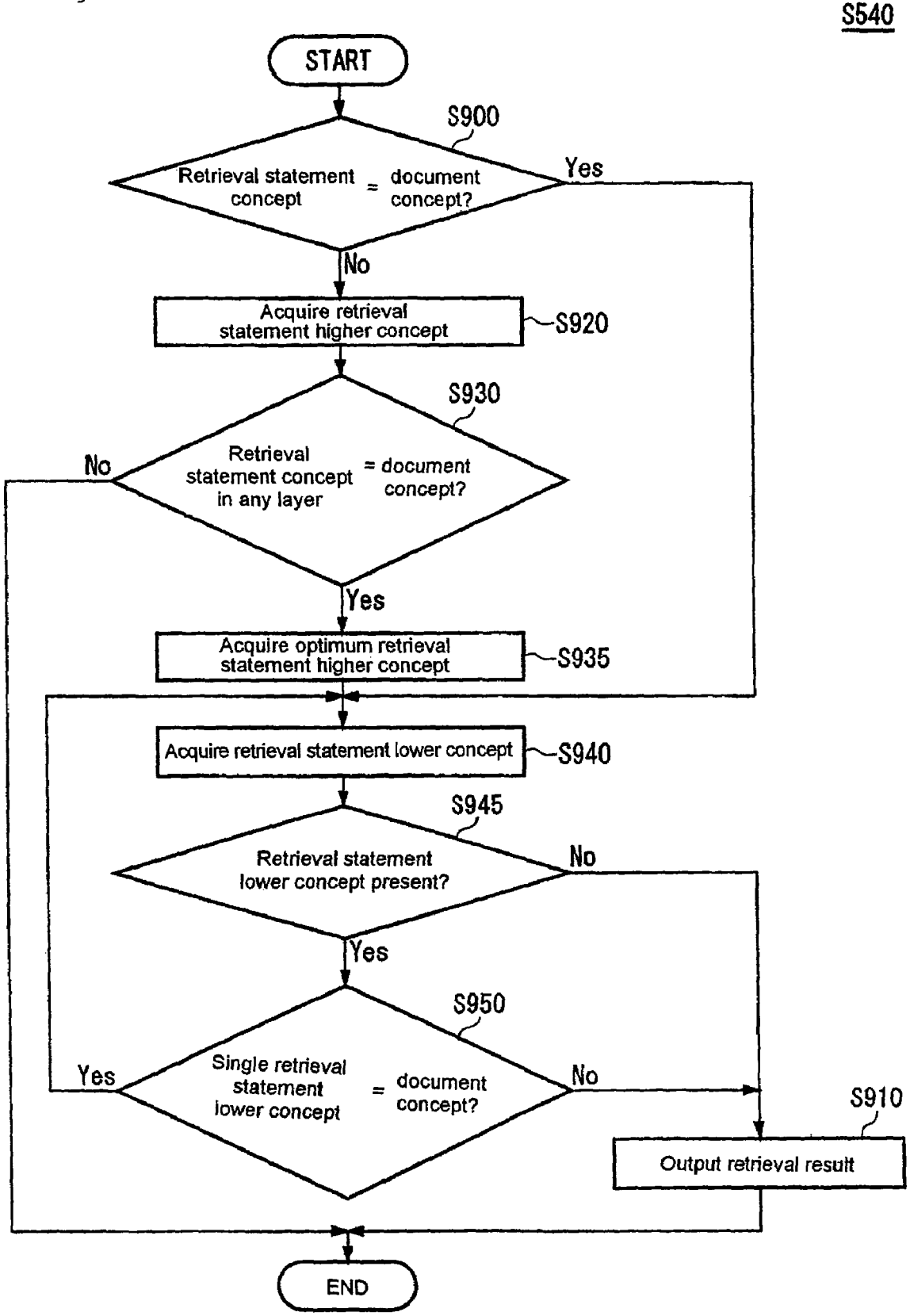
FIG. 9 is a diagram showing an operation flow of the concept retrieving section 150 according to the embodiment of the present invention.

FIG. 9 shows the operation flow of the concept retrieving section 150 according to the embodiment of the present invention. First, the concept retrieving section 150 receives one or more retrieval statement concepts extracted from a retrieval statement. The concept retrieving section 150 also receives, for each document data, one or more document concepts extracted from the document data. Then, if the retrieval statement concept matches the document concept (S900: Yes), the same concept output section 800 advances the process to S940. Thus, the same concept output section 800 outputs the document data to the retrieval result output section 160 as a retrieval result (S910) provided that the retrieval statement concept cannot be converted into a retrieval statement lower concept (S945:No). In this case, if a plurality of retrieval statement concepts and a plurality of document concepts are extracted in association with a plurality of hierarchical structures, if all the retrieval statement concepts are the same as one of the document concepts, the same concept output section 800 outputs this document data as a retrieval result. For example, if the three retrieval statement concepts "defect/hardware/hard disk", "product/PC product/notebook/series A/model A1", and "component/hardware/hard disk" are extracted, the same concept output section 800 outputs, as a retrieval result, document data including all these three concepts as document concepts.

On the other hand, if the retrieval statement concept does not match the document concept (S900:No), the higher concept acquiring section 810 acquires the retrieval statement higher concept (S920). If a plurality of retrieval statement concepts (for example, a first and second retrieval statement concepts) are extracted, the higher concept acquiring section 810 acquires a first retrieval statement higher concept that is a higher layer of the first retrieval statement concept and a second retrieval statement higher concept that is a higher layer of the second retrieval statement concept if the first retrieval statement concept is not the same as the first document concept and if the second retrieval statement concept is not the same as the second document concept.

If a retrieval statement concept is present which belongs to the defect concept hierarchy and which indicates that there is a defect in any component or the state of the defect in the component, the higher concept acquiring section 810 according to the present embodiment acquires a concept that is a higher layer of the retrieval statement and uses it as a retrieval statement higher concept. Further, if a retrieval statement concept is present which belongs to the component concept hierarchy, the higher concept acquiring section 810 acquires a concept that is a higher layer of a retrieval statement concept indicating a component and uses it as a retrieval statement higher concept. Furthermore, if a retrieval statement concept is present which belongs to the product concept hierarchy, the higher concept acquiring section 810 acquires a concept that is a higher layer of a retrieval statement concept indicating a product name and uses it as a retrieval statement concept.

For example, if the three retrieval statement concepts "defect/hardware/hard disk", "product/PC product/notebook/series A/model A1", and "component/hardware/hard disk" are extracted, the higher concept acquiring section 810 acquires the three retrieval statement higher concepts "defect/hardware", "product/PC product/notebook/series A", and "component/hardware" from the concept DB 106, the product DB 106, and the component DB 107. As a result, if the retrieval statement higher concepts are used to generalize one layer, the retrieval statement is converted into the following three higher concepts.

(1) Concept consisting of set of first retrieval statement higher concept "defect/hardware", retrieval statement concept "product/PC product/notebook/series A/model A1", and retrieval statement concept "component/hardware/hard disk"

For example, if the document data concept extracting section 130 extracts a document concept indicating that there is a defect in one component, on the basis of the keyword contained in the document data and the retrieval statement concept extracting section 145 extracts a retrieval concept indicating that there is a defect in part of the component, on the basis of the keyword contained in the retrieval statement, then the higher concept acquiring section 810 acquires a concept which is a higher layer of the retrieval statement concept and which indicates that there is the defect in the component, and uses it as a retrieval statement higher concept.

Likewise, if the document data concept extracting section 130 extracts a document concept indicating that there is a defect in one component, on the basis of the keyword contained in the document data and the retrieval statement concept extracting section 145 extracts a retrieval concept indicating the state of the defect in the component, on the basis of the keyword contained in the retrieval statement, then the higher concept acquiring section 810 acquires a concept which is a higher layer of the retrieval statement concept and which indicates that there is the defect in the component, and uses it as a retrieval statement higher concept. As a result, the retrieval result output section 160 can output, as a retrieval result, document data having a document concept which matches the retrieval statement higher concept and which indicates that there is the defect in the component.

(2) Concept consisting of set of retrieval statement concept "defect/hardware/hard disk", second retrieval statement higher concept "product/PC product/notebook/series A", and retrieval statement concept "component/hardware/hard disk"

For example, if the document data concept extracting section 130 extracts a document concept indicating a product name, on the basis of the keyword contained in the document data and the retrieval statement concept extracting section 145 extracts a retrieval statement concept indicating a product name that is a lower layer of the above product name, on the basis of the keyword contained in the retrieval statement, then the higher concept acquiring section 810 acquires a concept corresponding to a product name that is a higher layer of the retrieval statement concept and uses it as a retrieval statement higher concept.

(3) retrieval statement concept "defect/hardware/hard disk", retrieval statement concept "product/PC product/notebook/series A/model A1", and third retrieval statement higher concept "component/hardware"

For example, if the document data concept extracting section 130 extracts a document concept indicating a component, on the basis of the keyword contained in the document data and the retrieval statement concept extracting section 145 extracts a retrieval statement concept indicating a component that is a part of the above component, on the basis of the keyword contained in the retrieval statement, then the higher concept acquiring section 810 acquires a concept corresponding to a component that is a higher layer of the retrieval statement concept and uses it as a retrieval statement higher concept.

In the above description, the higher concept acquiring section 810 may acquire a concept located in a layer higher than that of the retrieval statement concept by a distance equal to a plurality of layers. In this case, the higher concept acquiring section 810 may sequentially replace the retrieval statement concept with the concept in the higher layer until the retrieval statement higher concept matches the document concept. Then, if the retrieval statement higher concept in any layer matches the document concept (S930:Yes), the higher concept acquiring section 810 may decide to use this retrieval statement higher concept. Further, if a combination of plural types of retrieval statement concepts and/or retrieval statement higher concepts is acquired in association with the retrieval statement, the generalized concept output section 820 selects a combination of appropriate retrieval statement concepts and/or retrieval statement higher concepts (S935).

In this process, the generalized concept output section 820 selects a retrieval statement higher concept that enables the retrieval of document data with a larger amount of information. For example, if the number of first document data in which the first retrieval statement higher concept is the same as the second retrieval statement concept and in which the first document concept is the same as the second document concept is smaller than that of second document data in which the first retrieval statement concept is the same as the second retrieval statement higher concept and in which the first document concept is the same as the second document concept, then the generalized concept output section 820 outputs the first document data as a retrieval result. This enables the generalized concept output section 820 to more appropriately select and output document data to be retrieved.

Then, the lower concept acquiring section 830 acquires a retrieval statement lower concept that is a lower layer of the retrieval statement concept in S900 or the retrieval statement concept obtained in S935 (S940). Then, if there is no retrieval statement lower concept for the retrieval statement concept obtained in S935 (S945:No), the generalized concept output section 820 outputs document data (see S930) having a document concept matching the retrieval statement higher concept, to the retrieval result output section 160 as a retrieval result (S910).

In this case, if a plurality of retrieval statement higher concepts is acquired, if at least one retrieval statement concept is determined to be a retrieval statement higher concept in a higher layer, an outputted retrieval result is document data having a document concept matching all the retrieval statement concepts or retrieval statement higher concepts replacing the retrieval statement concepts. For example, if a first retrieval statement higher concept and a second retrieval statement higher concept are acquired, if at least one of the first and second retrieval statement concepts is determined to be a concept in a higher layer, the generalized concept output section 820 outputs document data having a document concept matching the first or second retrieval statement concept, as a retrieval result.

On the other hand, if any retrieval statement lower concept is present (S945:Yes), provided that all the document data having the same document concept as that of the retrieval statement concept have the same document concept as that of a retrieval statement lower concept that is a lower layer of the retrieval statement concept (S950:Yes), the lower concept acquiring section 830 replaces the retrieval statement concept with the retrieval statement lower concept and then advances the process to S940 (S950:Yes). Then, the lower concept acquiring section 830 executes the processing in S940 and S945 again to further specialize the retrieval statement concept.

In this manner, the lower concept acquiring section 830 sequentially replaces the retrieval statement concept with the lower layer concept until the previously described condition is not established (S950: No). This enables the lower concept acquiring section 830 to select a concept located in a layer lower than that of the retrieval statement concept by a distance equal to a plurality of layers. Therefore, the lower concept acquiring section 830 can select an appropriate retrieval statement concept in accordance with the document concept of each document data stored in the retrieval index DB 135.

Then, the specialized concept output section 840 outputs document data in which the retrieval statement lower concept matches the document concept (S950:No), as a retrieval result (S910).

The concept retrieving section 150 shown above can appropriately retrieve document data to be retrieved, by converting the retrieval statement concept into a higher or a lower concept in accordance with the retrieval result.

If as a result of the above process, none of the retrieval statement concepts obtained have lower layer concepts, the retrieval result output section 160 displays a list of document data having the document concept matching the retrieval statement concept, in S545 in FIG. 5. On the other hand, if any retrieval statement concept has at least two lower concepts, the concept selection supporting section 155 displays, to the user, the number of document data retrieved if the retrieval statement concept is determined to be each of the at least two lower concepts. The user may then select one of the lower concepts. Alternatively, the retrieval result output section 160 may select one of the lower concepts on the basis of the number of document data retrieved, for example, on the basis of a reduction in entropy.

Figure 10:
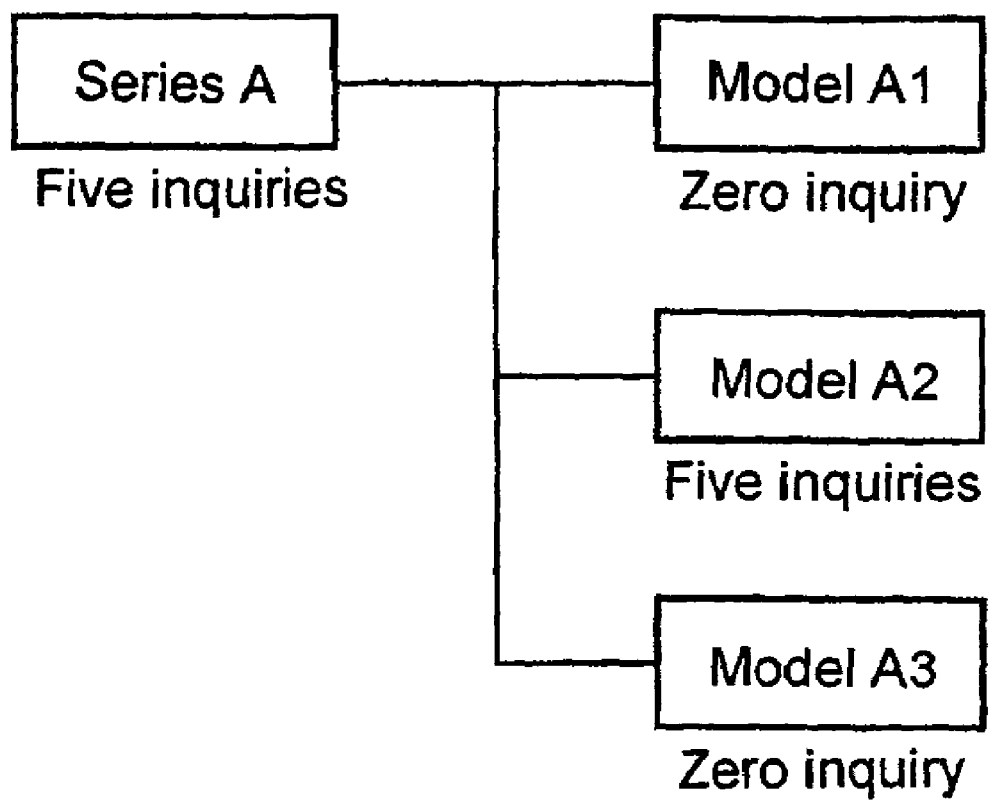
FIG. 10 is a diagram showing an example of generalization and specialization carried out by the concept retrieving section 150 according to the embodiment of the present invention.

FIG. 10 shows an example of generalization and specialization carried out by the concept retrieving section 150 according to the embodiment of the present invention. If no document data has the document concept matching the retrieval statement concept, the higher concept acquiring section 810 generalizes the retrieval statement concept as shown in S920 in FIG. 9. For example, in the figure, if the retrieval statement concept is ". . . /series A/model A3", the same concept output section 800 can extract no document data having the document concept that is the same as the retrieval statement concept "./series A/model A3". Thus, the higher concept acquiring section 810 replaces the retrieval statement concept ". . . /series A/model A3" with the retrieval statement higher concept in the higher layer ". . . /series A" for generalization.

This generalization enables the extraction of five document data having the document concept that is the same as the retrieval statement concept. In the case shown in the figure, the number of document data corresponding to ". . . /series A" is the same as that of document data corresponding to ". . . /series A/model A2". This indicates that all the document data having the document concept that is the same as the generalized retrieval statement concept (that is, the retrieval statement higher concept) have the document concept that is the same as the retrieval statement lower concept ". . . /series A/model A2". Thus, if all the document data having the document concept that is the same as the retrieval statement concept have the document concept that is the same as the retrieval statement lower concept that is a lower layer of the retrieval statement concept, the lower concept acquiring section 830 replaces the retrieval statement concept with the retrieval statement lower concept for specialization. This enables the lower concept acquiring section 830 to uniquely specialize the retrieval statement concept.

If a plurality of retrieval statement concepts is extracted, the lower concept acquiring section 830 can replace these retrieval statement concepts with a lower concept for specialization under the following condition: even if one or more retrieval statement concepts are converted into a lower concept, the same document data can be retrieved.

FIG. 11 shows an example of a display screen 1100 of the retrieval system 10 according to the embodiment of the present invention. The display screen 1100 comprises a retrieval statement input screen 1110, a concept operation screen 1130, and a retrieval result output screen 1160. The retrieval statement input screen 1110 allows the user of the retrieval system 10 to input a retrieval statement. The retrieval statement normalizing section 140 allows the user to input a product type name and the retrieval statement using the retrieval statement input screen 1110. The retrieval statement normalizing section 140 receives an instruction which is given using a retrieval button and which requests that retrieval be started. Further, if the concept retrieving section 150 has carried out generalization or specialization, the retrieval statement input screen 1110 shows this using the expression "Series A model A3 Replaced with Series A for Generalization".

The concept operation screen 1130 displays each retrieval statement concept extracted from the retrieval statement, on the basis of an instruction from the concept selection supporting section 155. If a plurality of retrieval statement concepts are extracted, the concept selection supporting section 155 displays the relationship among these retrieval statement concepts (AND or OR condition) on the concept operation screen 1130. Alternatively, the concept selection supporting section 155 may display the number (frequency) of document data having the document concept that is the same as each retrieval statement concept. Upon receiving an instruction which is given using a retrieval statement concept deletion button and which requests that the retrieval statement concept be deleted, the concept selection supporting section 155 removes the retrieval statement concept from retrieval conditions. Further, upon receiving an instruction which is given using a higher concept button and which requests that the retrieval statement concept be replaced with a retrieval statement higher concept in a higher layer, the concept selection supporting section 155 replaces the retrieval statement concept with the retrieval statement higher concept. The concept selection supporting section 155 displays the retrieval statement concept via the concept operation screen 1130. The concept selection supporting section 155 receives an operation on each retrieval statement concept to support the replacement of the retrieval statement concept with a higher concept and/or lower concept.

The retrieval result output section 1160 displays a retrieval result outputted by the retrieval result output section 160.

As shown above, the retrieval system 10 can retrieve document data while appropriately reflecting the contents of a retrieval statement in the retrieval on the basis of concepts systematized using a hierarchical structure. Thus, the user of the retrieval system 10 can efficiently perform a retrieval process via the display screen 1100.

The retrieval system 10 shown above can be used not only to retrieve inquiries about products and the corresponding responses but also as a technical information retrieving system that retrieves various pieces of technical information stored as document data, on the basis of a retrieval statement. For example, the retrieval system 10 maybe used to store information on various medicines as document data and to retrieve document data conceptually matching a retrieval statement such as "proteins multiplying cancer cells".

Figure 12:
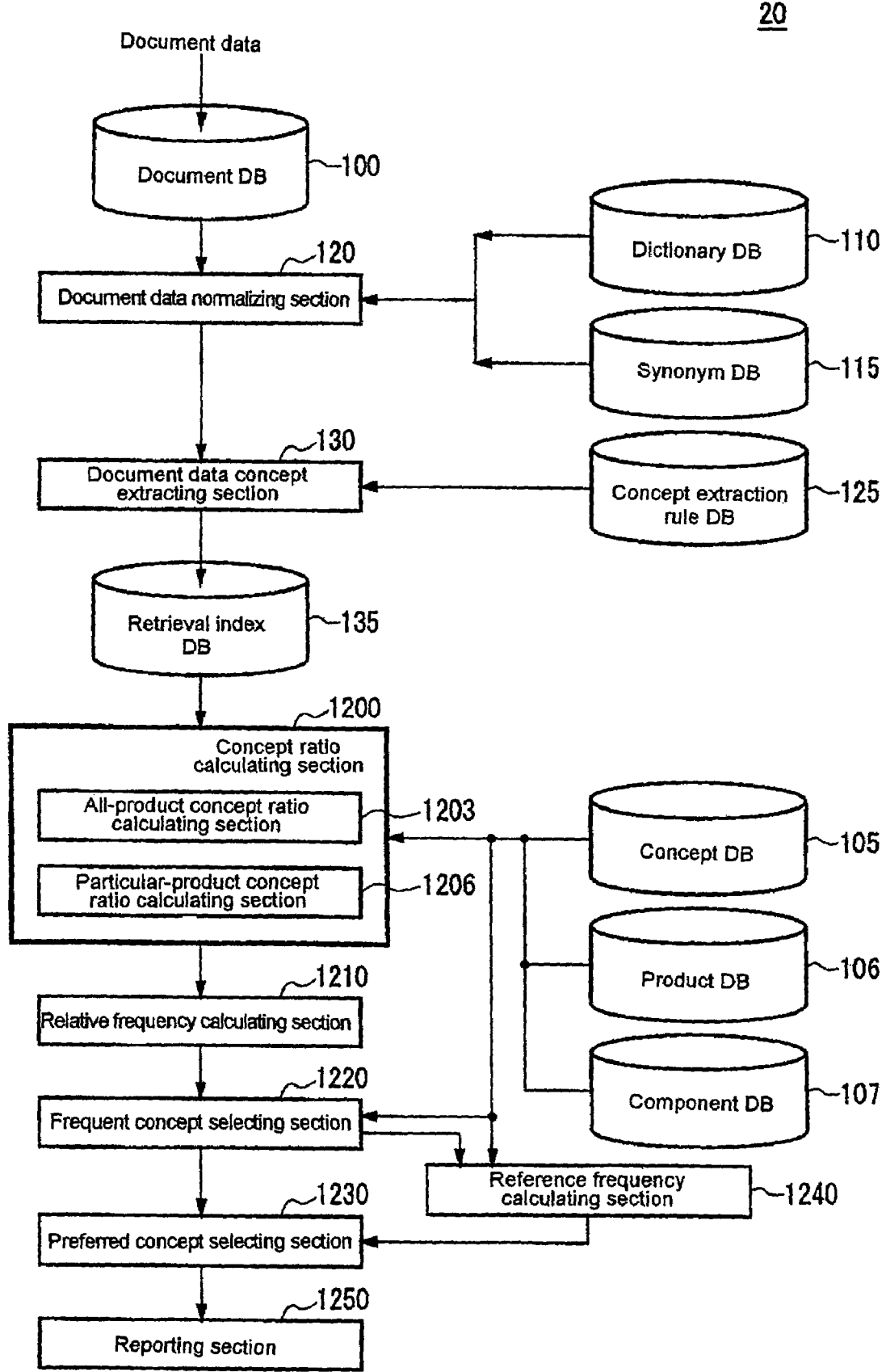
FIG. 12 is a diagram showing the configuration of a reporting system 20 according to the embodiment of the present invention.

FIG. 12 shows the configuration of a reporting system according to the embodiment of the present invention. The reporting system 20 extracts document concepts from sequentially inputted document data and informs the user that the frequency of a particular document concept has reached a predetermined value. The reporting system 20 according to the present embodiment extracts document concepts indicating defects from document data obtained by documenting inquiries about products made to a call center. Then, if the frequency of a particular document concept has reached a predetermined value, the reporting system 20 informs the user that this defect is frequently occurring.

The reporting system 20 comprises the document DB 100, the concept DB 105, the product DB 106, the component DB 107, the dictionary DB 110, the synonym DB 115, the document data normalizing section 120, the concept extraction rule DB 125, the document data concept extracting section 130, the retrieval index DB 135, a concept ratio calculating section 1200, a relative frequency calculating section 1210, a frequent concept selecting section 1220, a preferred concept selecting section 1230, a reference frequency calculating section 1240, and a reporting section 1250. The following components have substantially the same functions and configurations as those of the members with the same reference numerals shown in FIG. 1: the document DB 100, the concept DB 105, the product DB 106, the component DB 107, the dictionary DB 110, the synonym DB 115, the document data normalizing section 120, the concept extraction rule DB 125, the document data concept extracting section 130, and the retrieval index DB 135. Accordingly, the description of these components is omitted except for their differences from the members shown in FIG. 1.

The document DB 100 sequentially stored inputted document data. The document DB 100 according to the present embodiment stores document data indicating the contents of defects in each of a plurality of products. The concept DB 105 uses the hierarchical structure illustrated in FIG. 2 to store a plurality of concepts identifying the respective defects in the product.

The concept ratio calculating section 1200 uses document concepts stored in the retrieval index DB 135 to calculate the ratio of the number of document data corresponding to each concept to the number of document data in the document DB 100. The concept ratio calculating section 1200 has an all-product concept ratio calculating section 1203 and a particular-product concept ratio calculating section 1206. The all-product concept ratio calculating section 1203 calculates the ratio between the number of document data and the number of document data corresponding to each concept, for a plurality of products to be compared. For example, if 1,000 document data are stored in the document DB 100 and 35 document data have the document concept "/defect/hardware/hard disk", the ratio is 3.5% (35/1000).

The particular-product concept ratio calculating section 1206 calculates, for at least one product to be reported to have a frequently occurring defect, the ratio between the number of document data and the number of document data on the product which correspond to each concept. For example, if 100 document data are stored in the document DB 100 in connection with the product "/product/PC product/notebook/series A/model A2" and 10 document data have the document concept "/defect/hardware/hard disk", the ratio is 10% (10/100).

The relative frequency calculating section 1210 calculates a relative frequency indicating the magnitude of a ratio calculated by the particular-product concept ratio calculating section 1206 in the concept ratio calculating section 1200 with respect to a reference ratio corresponding to each concept. The relative frequency calculating section 1210 according to the present embodiment uses a ratio calculated by the all-product concept ratio calculating section 1203 to calculate a relative frequency indicating the magnitude of the ratio calculated by the particular-product concept ratio calculating section 1206 with respect to the ratio calculated by the all-product concept ratio calculating section 1203. In the above example, the relative frequency corresponding to the document concept "/defect/hardware/hard disk" for the product "/product/PC product/notebook/series A/model A2" is about 2.9 (10%/3.5%).

The frequent concept selecting section 1220 selects those of a plurality of concepts whose relative frequency has at least a prespecified threshold. The preferred concept selecting section 1230 selects one of a first concept selected by the frequent concept selecting section 1220 and a second concept that is a higher layer of the first concept. This allows the preferred concept selecting section 1230 to appropriately select the layer of a concept to be reported, the concept being included in the concepts that are higher or lower layers of concepts selected by the frequent concept selecting section 1220.

The reference frequency calculating section 1240 calculates a frequency used as a reference when a concept to be reported is selected. The reporting section 1250 informs the user that the first or second concept selected by the preferred concept selecting section 1230 has an increased relative frequency.

With the reporting system 20 shown above, if document data corresponding to a particular concept is frequently inputted, the layer of the concept can be appropriately selected to inform the user that the concept is frequently occurring. Thus, the document DB 100, in which inquiries to the call center are sequentially registered as document data, can be utilized to detect and report to the user early that a particular defect is frequently occurring in a certain product.

The reporting system 20 shown above may be a part of the retrieval system 10 shown in FIG. 1. For example, the retrieval system 20 shown above may further comprise the concept ratio calculating section 1200, relative frequency calculating section 1210, frequent concept selecting section 1220, preferred concept selecting section 1230, reference frequency calculating section 1240, and reporting section 1250, all of which are shown in FIG. 12.

Figure 13:
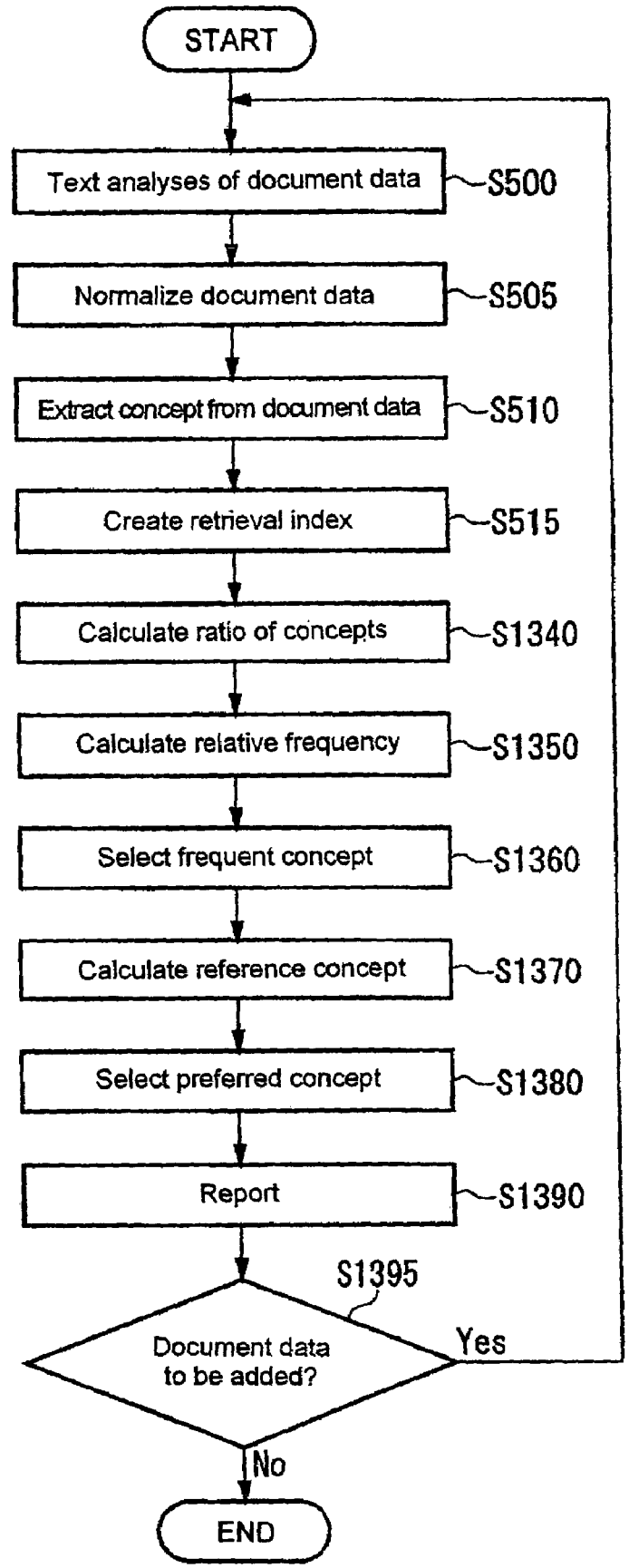
FIG. 13 is a diagram showing an operation flow of the reporting system 20 according to the embodiment of the present invention.

FIG. 13 is an operation flow of the reporting system 20 according to the embodiment of the present invention. In FIG. 13, steps with the same numbers as those in FIG. 5 perform substantially the same operations as those in FIG. 5. Accordingly, their description is omitted except for their differences from the steps shown in FIG. 5.

First, every time document data are inputted, the reporting system 20 carries out text analyses of the document data (S500), normalization (S505), concept extraction (S510), and creation of retrieval indices (S515). Then, the concept ratio calculating section 1200 calculates the ratio of the number of document data corresponding to each concept or a set of concepts to the number of document data in the document DB 100 (S1340). More specifically, the all-product concept ratio calculating section 1203 uses Equation (1), shown below, to calculate a ratio $R_{all}$ for all the products. The particular-product concept ratio calculating section 1206 uses Equation (2), shown below, to calculate a ratio R for a product to be reported to have a defect.

$$R_{all} = \#(A_{all} \cap X)/\#A_{all} \quad (1)$$

$$R = \#(A \cap X)/\#A \quad (2)$$

In these equations, reference character $A_{all}$ denotes all products and reference character A denotes a product to be reported to have a defect. Reference numeral X denotes a concept or a set of concepts corresponding to the defect and reference character #C denotes the number of document data corresponding to a concept C. All the products are a plurality of products contributing to a reference ratio used as a reference with which the relative frequency calculating section 1210 calculates a relative frequency. The reporting system 20 may use, as products contributing to the reference ratio, a plurality of products corresponding to a layer in the product concept hierarchy illustrated in FIG. 3 which is determined to have substantially the same tendency of occurrence of defects. For example, the reporting system 20 use, as products contributing to the reference ratio, "series A", "series B", "series C", and the like located in the lower layer of "product/PC product/notebook" in FIG. 3.

If the concept DB 105 stores each of a plurality of concepts as a node of a plurality of hierarchical structures including the defect concept hierarchy, the product concept hierarchy, and the component concept hierarchy, then the document data concept extracting section 130 may extract a plurality of document concepts belonging to the respective hierarchical structures in association with the document data (S510) For example, if the concept DB 105 stores each of a plurality of concepts as a node of the first or second hierarchical structure, the document data concept extracting section 130 may extract a first document concept belonging to the first hierarchical structure and a second document concept belonging to the second hierarchical structure.

In this case, the concept ratio calculating section 1200 calculates, for all the products and for each of the target products, the first ratios $R1_{all}$ and R1 of the number of document data corresponding to a concept in the first hierarchical structure to the number of document data in the document DB 100, the second ratios $R2_{all}$ and R2 of the number of document data corresponding to a concept in the second hierarchical structure to the number of document data in the document DB 100, and the third ratios $R1\&2_{all}$ and R1&2 of the number of document data corresponding to a combination of the concept in the first hierarchical structure and the concept in the second hierarchical structure to the number of document data in the document DB 100.

Then, the relative frequency calculating section 1210 calculates a relative frequency RR ($=R/R_{all}$) indicating the magnitude of a ratio calculated by the particular-product concept ratio calculating section 1206 in the concept ratio calculating section 1200 with respect to a reference ration corresponding to each concept (S1350). The relative frequency calculating section 1210 uses the ratio calculated by the all-product concept ratio calculating section 1203 as a reference ratio to calculate a relative frequency indicating how the ratio calculated by the particular-product concept ratio calculating section 1206 for a target product to be reported to have a defect is higher than the average ratio for all the products.

In this case, if a set of a first and second document concepts are extracted in association with the document data, the relative frequency calculating section 1210 calculates a first relative frequency RR1 ($=R1/R1_{all}$) indicating the magnitude of the first ratio R1 with respect to the reference ratio $R1_{all}$ corresponding to a concept X1 in the first hierarchical structure, a second relative frequency RR2 ($=R2/R2_{all}$) indicating the magnitude of the second ratio R2 with respect to the reference ratio R2all corresponding to a concept X2 in the second hierarchical structure, and a third relative frequency RR1&2 ($=R1\&2/R1\&2_{all}$) indicating the magnitude of the third ratio R1&2 with respect to the reference ratio R1&2all corresponding to the concepts X1 and X2 corresponding to the combination of the concept in the first hierarchical structure and the concept in the second hierarchical structure.

Here, if the number of document data for the product corresponding to the concept is small, the relative frequency calculating section 1210 correctively reduces the relative frequency of the concept for the product compared to the case in which the number of document data is large. More specifically, the relative frequency calculating section 1210 may use the minimum value in a confidence interval in an interval estimation with a confidence coefficient of 80%, as a relative frequency. This enables the relative frequency calculating section 1210 to avoid reporting defects when the number of samples available is so small that it is difficult to determine whether or not any defect is frequently occurring.

Then, the frequent concept selecting section 1220 selects those of a plurality of concepts whose relative frequency is at least a prespecified threshold (S1360). More specifically, the frequent concept selecting section 1220 selects those of the plurality of concepts for which the relative frequency for at least one product is at least the prespecified threshold. Here, if plural sets each of a concept in the first hierarchical structure and a concept in the second hierarchical structure are extracted, the frequent concept selecting section 1220 selects those of the sets of a concept in the first hierarchical structure and a concept in the second hierarchical structure whose relative frequency is at least the threshold.

Then, if document data corresponding to a combination of two or more document concepts has a relative frequency equal to or higher than the threshold, the reference frequency calculating section 1240 calculates a reference frequency with which a choice is made as to whether to report the combination of these document concepts or a higher or lower concept replacing the combination of these document concepts (S1370).

More specifically, the reference frequency calculating section 1240 obtains a calculated value $RR1\&2_{base}$ for the relative frequency in the case where the first and second document concepts are independent events, as a reference frequency with which a determination is made as to whether to report the combination of the first and second document concepts or the first document concept. The reference frequency calculating section 1240 uses Equation (3), shown below, to calculate the reference frequency $RR1\&2base$ on the basis of the relative frequency $RR1$ for the first document concept and the relative frequency $RR2$ for the second document concept.

$$RR1\&2_{base}=RR1 \times RR2 \times (\#(X1 \cap A_{all}) \times \#(X2 \cap A_{all}))/(\#(X1 \cap X2 \cap A_{all}) \times \#A_{all})$$

Then, the preferred concept selecting section 1230 selects one of the concept selected by the frequent concept selecting section 1220 and the higher layer concept of this concept on the basis of the relative frequencies of the selected concept and its higher layer concept (S1380). The preferred concept selecting section 1230 may select the higher layer concept from the concepts selected by the frequent concept selecting section 1220. With the processing in S1380, if a particular concept has a relative frequency equal to or higher than the threshold, the preferred concept selecting section 1230 chooses whether to report this concept or its higher layer concept.

More specifically, the preferred concept selecting section 1220 chooses whether to report a concept X consisting of a set of one or more document concepts {X1, X2, ..., Xn} or a concept Y consisting of a set of one or more document concepts {Y1, Y2, ..., Ym} and which is more specific than the concept X, as shown below in (1) or (2). Here, the expression "the concept Y is more specific than the concept X" means that for an arbitrary Xi, a Yj is the same as the Xi or is a lower layer of the Xi in a certain concept hierarchy. Another possible expression is that the concept X is more general than the concept Y.

(1) Case in which X={X1, X2, ..., Xn} and Y={Y1, Y2, ..., Yn} and all Xks are the same as Yk or are its higher layer in a certain concept hierarchy For example, the concept X is "/defect/hardware/input device/pointing device" (={X1}). The concept Y is "/defect/hardware/input device/pointing device/mouse" (={Y1}).

In this case, the preferred concept selecting section 1230 determines whether or not Equation (4), shown below, is met by the concept Y (={Y1, Y2, ..., Yn} selected by the frequent concept selecting section 1220 and its higher layer concept X (={X1, X2, ..., Xn}.

$$\text{(relative frequency of } Y) > \alpha \times (\text{relative frequency of } X) \quad (4)$$

In this equation, reference character a denotes a prespecified rate that has a value of, for example, about 1.5 to 2.

The preferred concept selecting section 1230 selects the concept Y if its relative frequency is higher than that of the concept X by at least a prespecified rate α. The preferred concept selecting section 1230 selects the concept X if the relative frequency of the concept Y is not higher than that of the concept X by at least the prespecified rate α. Thus, the preferred concept selecting section 1230 can report the concept Y if the higher layer concept X has a low relative frequency, while the concept Y has a high relative frequency. Further, the preferred concept selecting section 1230 can report the concept X into which the concept Y is integrated if the higher layer concept X has a somewhat high relative frequency.

(2) Case in which X={X1, X2, ..., Xn} and Y={Y1, Y2, ..., Yn, Ym} and all Xks (k=1, ..., n) are the same as Yk or are its higher layer in a certain concept hierarchy For example, the concept X is "/component/hardware/fan" (={X1}) and the concept Y is "/component/hardware/fan" (=Y1) && "/problem/hardware/noise" (=Y2). Reference character "&&" indicates that the concept Y is an AND condition for the concepts Y1 and Y2.

In this case, the preferred concept selecting section 1230 determines whether or not Equation (5), shown below, is met by the concept Y selected by the frequent concept selecting section 1220 and its higher layer concept X. In this equation, reference numeral Z denotes a set of differences between X and Y in the case in which the distinction between the higher and lower layers within the same concept hierarchy is not taken into account (={Yn+1, ..., Ym}; in the above example, {Y2})

$$\text{(relative frequency of } Y) > \alpha \times (\text{relative frequency of } Y \text{ in the case where } X \text{ and } Z \text{ are independent events)} \quad (5)$$

If the relative frequency $RR1\&2$ of the concept Y is higher, by at least the prespecified rate α, than the calculated value $RR1\&2_{base}$ of the relative frequency of the concept Y obtained if the concepts X and Z are independent events, the preferred concept selecting section 1230 selects the concept Y, which is the combination of the concepts X and Z. If the relative frequency $RR1\&2$ of the concept Y is not higher than the calculated value $RR1\&2_{base}$ by at least the prespecified rate α, the preferred concept selecting section 1230 selects the concept X. Thus, the preferred concept selecting section 1230 can cause the concept Y to be reported if the concept Y is likely to result from the combination of the concepts X and Z.

The preferred concept selecting section 1230 may apply both (1) and (2) described above to the concept Y to determine a concept X in a much higher layer.

Then, the reporting section 1250 reports to the user of the retrieval system 10 that the defect corresponding to the concept Y or X selected by the preferred concept selecting section 1230 is frequently occurring in at least one product (S1390). In the case of (2), the reporting section 1250 informs the user that the concept Y or X selected by the preferred concept selecting section 1230 has an increased relative frequency, the concept Y being the combination of the concepts X and Z.

Then, when new document data are added to the document DB 100, the reporting system 20 advances the process to S500

(S1395). Alternatively, the reporting system 20 may execute the above process every prespecified period, for example, every week.

The reporting system 20 shown above extracts a document concept from each of sequentially inputted document data and reports concepts selected by the frequent concept selecting section 1220 and preferred concept selecting section 1230. Thus, if the frequency of a particular document concept or a set of document concepts reaches a predetermined value or more, the reporting system can notify the user of this. Consequently, the user can be notified of a defect in a product early, for example, on the basis of the number of inquiries about the product made to the call center.

Figure 14:
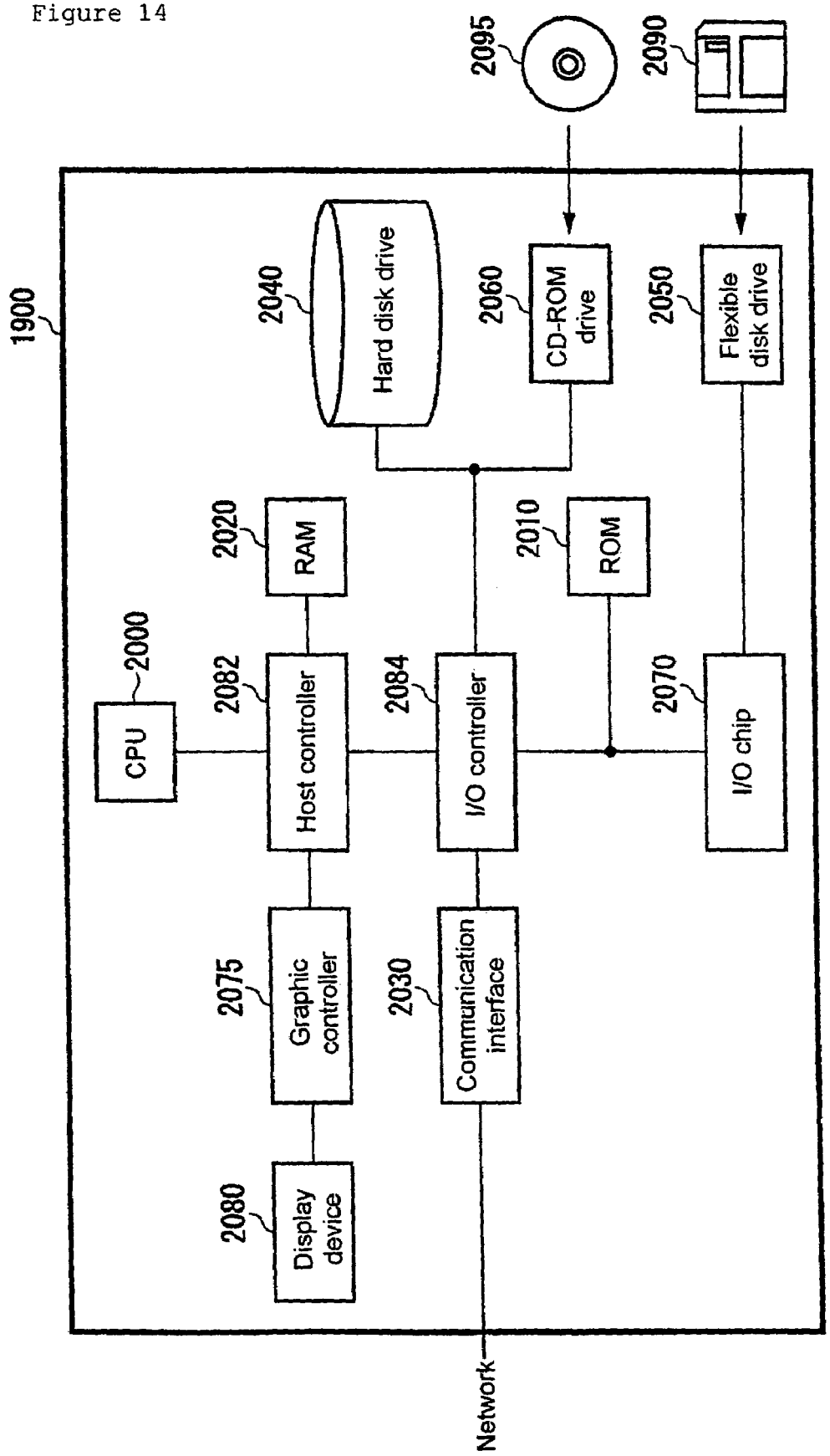
FIG. 14 is a diagram showing an example of the configuration of hardware in a computer 1900 according to the embodiment of the present invention.

FIG. 14 shows an example of the configuration of hardware in a computer 1900 according to the present embodiment. The computer 1900 according to the present embodiment comprises a CPU peripheral section having a CPU 2000, a RAM 2020, a graphic controller 2075, and a display device 2080 all of which are connected together by a host controller 2082, an I/O section having a communication interface 2030, a hard disk drive 2040, and a CD-ROM drive 2060 all of which are connected to the host controller 2082 by an I/O controller 2084, and a legacy I/O section having a ROM 2010, a flexible drive 2050, and an I/O chip 2070 all of which are connected to the I/O controller 2084.

The host controller 2082 connects the RAM 2020, the CPU 2000, which accesses the RAM 2020 at a high transfer rate, and the graphic controller 2075 together. The CPU 2000 operates on the basis of programs stored in the ROM 2010 and RAM 2020 to control each section. The graphic controller 2075 acquires image data generated by the CPU 2000 or the like on a frame buffer provided in the RAM 2020. The graphic controller 2075 then displays the image data on the display device 2080. Alternatively, the graphic controller 2075 may contain a frame buffer that stores image data generated by the CPU 2000 or the like.

The I/O controller 2084 connects the host controller 2082 to the communication interface 2030, hard disk drive 2040, and CD-ROM drive 2060, all of which are relatively fast I/O devices. The communication interface 2030 communicates with other devices via a network. The hard disk drive 2040 stores programs and data used by the CPU 2000 in the computer 1900. The CD-ROM drive 2060 reads a program or data from the CD-ROM 2095 and provides it to the hard disk drive 2040 via the RAM 2020.

Further, the I/O controller 2084 connects to the ROM 2010, flexible disk 2050, and I/O chip 2070, all of which are relatively slow I/O devices. The ROM 2010 stores, for example, a boot program executed by the computer 1900 during activation and programs depending on the hardware of the computer 1900. The flexible disk drive 2050 reads a program or data from the flexible disk 2090 and provides it to the hard disk drive 2040 via the RAM 2020. The I/O chip 2070 connects to the flexible disk drive 2050 and to various I/O devices via, for example, a parallel port, a serial port, a keyboard port, or a mouse port.

The program provided to the hard disk drive 2040 via the RAM 2020 is stored in a recording medium such as the flexible disk 2090, the CD-ROM 2095, or an IC card before being provided by the user. The program is read from the recording medium and installed in the hard disk drive 2040 in the computer 1900 via the RAM 2020. The program is then executed in the CPU 2000.

A retrieval program installed in the computer 1900 to cause the computer 1900 to function as the retrieval system 10 comprises a document DB managing module that manages the document DB 100, a concept DB managing module that manages the concept DB 105, a product DB managing module that manages the product DB 106, a component DB managing module that manages the component DB 107, a dictionary DB module that manages the dictionary DB 110, a synonym DB module that manages the synonym DB 115, a document data normalizing module, a concept extraction rule DB module that manages the concept extraction rule DB 125, a document data concept extracting module, a retrieval index DB module that manages the retrieval index DB 135, a retrieval statement normalizing module, a concept extraction module, a concept retrieval module, a concept selection support module and a retrieval result output module. These programs or modules operate on the CPU 2000 and the like to cause the computer 1900 to function as the document DB 100, the concept DB 105, the product DB 106, the component DB 107, the dictionary DB 110, the synonym DB 115, the document data normalizing section 120, the concept extraction rule DB 125, the document data concept extracting section 130, the retrieval index DB 135, the retrieval statement normalizing section 140, the retrieval statement concept extracting section 145, the concept retrieving section 150, the concept selection supporting section 155, and the retrieval result output section 160.

Further, a retrieval program installed in the computer 1900 to cause the computer 1900 to function as the reporting system 20 comprises a document DB managing module that manages the document DB 100, a concept DB managing module that manages the concept DB 105, a product DB managing module that manages the product DB 106, a component DB managing module that manages the component DB 107, a dictionary DB module that manages the dictionary DB 110, a synonym DB module that manages the synonym DB 115, a document data normalizing module, a concept extraction rule DB module that manages the concept extraction rule DB 125, a document data concept extracting module, a retrieval index DB module that manages the retrieval index DB 135, a concept ratio calculating module having an all-product concept ratio calculating module and a particular-product concept ratio calculating module, a relative frequency calculating module, a frequent concept selecting module, a preferred concept selecting module, a reference frequency calculating module, and a reporting module. These programs or modules operate on the CPU 2000 and the like to cause the computer 1900 to function as the document DB 100, the concept DB 105, the product DB 106, the component DB 107, the dictionary DB 110, the synonym DB 115, the document data normalizing section 120, the concept extraction rule DB 125, the document data concept extracting section 130, the retrieval index DB 135, the concept ratio calculating section 1200 having the all-product concept ratio calculating section 1203 and particular-product concept ratio calculating section 1206, the relative frequency calculating section 1210, the frequent concept selecting section 1220, the preferred concept selecting section 1230, the reference frequency calculating section 1240, and the reporting section 1250.

The programs or modules shown above may be stored in an external storage medium. Examples of the storage medium include not only the flexible disk 2090 and the CD-ROM 2095 but also an optical recording medium such as a DVD or CD, a magneto-optic recording medium such as an MO, a tape medium, and a semiconductor memory such as an IC card. Alternatively, the recording medium may be a storage device such as a hard disk or RAM provided in a server system connected to a private communication network or the Internet. Then, the program may be provided to the computer 1900 via the network.

The present invention has been described in conjunction with its embodiment. However, the technical scope of the present invention is not limited to the one described in the embodiment. It is apparent to those skilled in the art that various changes or improvements may be made to the above embodiment. As is apparent from the description of the claims, forms with such changes or modifications are also included in the technical scope of the present invention. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A retrieval system for retrieving document data which have a content specified by an inputted retrieval statement among a plurality of document data, the system comprising:
   a storage device comprising:
   a document database that stores the plurality of document data;
   a concept database that stores a plurality of pre-specified concepts using a hierarchical structure in which a first concept including a second concept is a higher layer of the second concept;
   a concept extraction rule database that stores concept extraction rules comprising sets of one or more of the keywords and concepts indicating meanings of the one or more keywords,
   a processor configured for:
   extracting document concepts on the basis of keywords contained in the respective document data, the document concepts being the concepts corresponding to the document data;
   extracting a retrieval statement concept on the basis of a keyword contained in the retrieval statement, the retrieval statement concept being the concept corresponding to said retrieval statement;
   retrieving document data in which the retrieval statement concept is a higher or lower layer of a document concept among the plurality of document data;
   outputting document data retrieved by a concept retrieving section, as the document data containing the content specified by the retrieval statement;
   wherein the processor extracts the concept contained in the concept extraction rule as the retrieval statement concept if said retrieval statement comprises the one or more keywords contained in any of the concept extraction rules,
   wherein the processor extracts the concept contained in the concept extraction rule and uses said concept as the document concept if said document data include the one or more keywords contained in any of the concept extraction rules, and
   wherein the retrieval system further comprises:
   a retrieval index database that stores, for each of the document data, an association between the document data and the document concept of the document data extracted by the document data concept extracting section, wherein the concept retrieving section outputs said document data corresponding to the document concept of said document concept stored in the retrieval index database before the retrieval statement is inputted;
   information storage space storing a synonym database that stores an association between a predetermined word or phrase and the keyword that is a synonym of the word or phrase;
   a processor configured to perform data normalizing section that normalizes the document data by replacing the word or phrase contained in each of said document data with the keyword that is the synonym of the word or phrase; and information storage space storing a retrieval statement normalizing section that normalizes the retrieval statement by replacing the word or phrase contained in said retrieval statement with the keyword that is the synonym of the word or phrase, wherein the processor extracts the document concept from the normalized document data, and the retrieval statement concept extracting section extracts the retrieval statement concept from the normalized retrieval statement;

wherein the processor is configured to:

acquire a retrieval statement higher concept that is a higher-layer concept of said retrieval statement concept if the retrieval statement concept does not match the document concept; and output the document data as a retrieval result if the retrieval statement higher concept matches the document concept;

wherein:

the concept database stores each of said plurality of concepts as a node of the first or second hierarchical structure, the processor extracts the first document concept belonging to the first hierarchical structure and the second document concept belonging to the second hierarchical structure in association with the document data, the processor extracts the retrieval statement concept belonging to the first hierarchical structure and the second retrieval statement concept belonging to the second hierarchical structure in association with the retrieval statement, the processor acquires the first retrieval statement higher concept that is a higher layer of the first retrieval statement concept and the second retrieval statement higher concept that is a higher layer of the second retrieval statement concept if the first retrieval statement concept does not match the first document concept and if the second retrieval statement concept does not match the second document concept, and the processor outputs the first document data as a retrieval result if the number of the first document data in which the first retrieval statement higher concept is the same as the second retrieval statement concept and in which the first document concept is the same as the second document concept is smaller than that of the second document data in which the first retrieval statement higher concept is the same as the second retrieval statement concept and in which the first document concept is the same as the second document concept, or wherein the processor is configured to replace the retrieval statement concept with the retrieval statement lower concept:

if all the document data having the document concept that is the same as the retrieval statement concept have the document concept that is the same as a retrieval statement lower concept that is a lower layer of the retrieval statement concept; and outputting the document data in which the retrieval statement lower concept matches the document concept, as a retrieval unit; and wherein:

the concept database stores the plurality of concepts that identify a plurality of defects in a product, the document database stores the document data indicating contents of each of the plurality of defects, the retrieval statement concept extracting section extracts the retrieval statement concept corresponding to the retrieval statement used to retrieve said defects in the product, and the processor outputs the document data retrieved, as said document data indicating the contents of the defects in the product inputted by a user; or wherein:

the concept database stores the plurality of concepts in a lower layer of the concept indicating that there are defects in components of the product, using a hierarchical structure in which the concepts indicating states of the defects in the components are provided, the document data concept extracting section extracts the document concept indicating that there is a defect in one of the components, on the basis of the keyword contained in the document data, the retrieval statement concept extracting section extracts the retrieval statement concept indicating the state of the defect in the one of said components, on the basis of the keyword contained in the retrieval statement, and wherein the concept retrieving section comprises:

a higher concept acquiring section that acquires a retrieval statement higher concept that is the concept indicating that there is the defect in the one of said components, the concept being a higher layer of the retrieval statement concept; and a generalized concept outputting section that outputs, as a retrieval result, the document data having the document concept indicating that there is the defect in the one of the components, the document concept matching the retrieval statement higher concept; and further comprising a component database that uses a hierarchical structure to store inclusive relationships among the components of the product, wherein:

the processor further extracts the document concept indicating the component described in the document data, on the basis of the keyword contained in the document data, the processor further extracts the retrieval statement concept indicating the component described in the retrieval statement concept extracting section, on the basis of the keyword contained in the retrieval statement, the processor acquires the concept that is a higher layer of the first retrieval statement concept indicating that there is the defect in the component or a state of the defect in the component, and the concept that is a higher layer of the second retrieval statement concept indicating the component, and the processor outputs, as a retrieval result, the document data having the document concept that matches the first retrieval statement concept and the document concept that matches the second retrieval statement concept if at least one of the first retrieval statement concept and the second retrieval statement concept is the concept in the higher layer; or a product database that uses a hierarchical structure to store inclusive relationships among the names of a plurality of the products, wherein the document data concept extracting section further extracts the document concept indicating the product name described in the document data, on the basis of the keyword contained in said document data, the retrieval statement concept extracting section further extracts the retrieval statement concept indicating the product name described in the retrieval statement concept extracting section, on the basis of the keyword contained in the retrieval statement, the higher concept acquiring section acquires the concept that is a higher layer of the first retrieval statement concept indicating that there is the defect in the component or a state of the defect in the component, and the concept that is a higher layer of the second retrieval statement concept indicating the product name, and the generalized concept outputting section outputs, as a retrieval result, the document data having the document concept that matches the first retrieval statement concept and the document concept that matches the second retrieval statement concept if at least one of the first retrieval statement concept and the second retrieval statement concept is the concept in the higher layer.

2. The retrieval system according to claim 1, wherein said document data concept extracting section extracts said concept contained in the concept extraction rule and uses the concept as said document concept if said document data include said one or more keywords contained in any of said concept extraction rules.

3. The retrieval system according to claim 1, further comprising a retrieval index database that stores, for each of said document data, an association between the document data and said document concept of the document data extracted by said document data concept extracting section, wherein said concept retrieving section outputs said document data corresponding to the document concept as a retrieval result if said retrieval statement concept is a higher- or lower-layer concept of said document concept stored in said retrieval index database before said retrieval statement is inputted.

4. The retrieval system according to claim 1, further comprising: a synonym database that stores an association between a predetermined word or phrase and said keyword that is a synonym of the word or phrase; a document data normalizing section that normalizes the document data by replacing said word or phrase contained in each of said document data with said keyword that is the synonym of the word or phrase; and a retrieval statement normalizing section that normalizes said retrieval statement by replacing said word or phrase contained in said retrieval statement with said keyword that is the synonym of the word or phrase, wherein said document data concept extracting section extracts said document concept from said normalized document data, and said retrieval statement concept extracting section extracts said retrieval statement concept from said normalized retrieval statement.

5. The retrieval system according to claim 1, wherein said concept retrieving section comprises: a higher concept acquiring section that acquires a retrieval statement higher concept that is a higher-layer concept of said retrieval statement concept if said retrieval statement concept does not match said document concept; and a generalized concept output section that outputs the document data as a retrieval result if said retrieval statement higher concept matches said document concept.

6. The retrieval system according to claim 5, wherein said concept database stores each of said plurality of concepts as a node of said first or second hierarchical structure, said document data concept extracting section extracts said first document concept belonging to said first hierarchical structure and said second document concept belonging to said second hierarchical structure in association with said document data, said retrieval statement concept extracting section extracts said retrieval statement concept belonging to said first hierarchical structure and said second retrieval statement concept belonging to said second hierarchical structure in association with said retrieval statement, said higher concept acquiring section acquires said first retrieval statement higher concept that is a higher layer of said first retrieval statement concept and said second retrieval statement higher concept that is a higher layer of said second retrieval statement concept if said first retrieval statement concept does not match said first document concept and if said second retrieval statement concept does not match said second document concept, and said generalized concept output section outputs said first document data as a retrieval result if the number of said first document data in which said first retrieval statement higher concept is the same as said second retrieval statement concept and in which said first document concept is the same as said second document concept is smaller than that of said second document data in which said first retrieval statement higher concept is the same as said second retrieval statement concept and in which said first document concept is the same as said second document concept.

7. The retrieval system according to claim 1, wherein said concept retrieving section comprises: a lower concept acquiring section that, if all said document data having said document concept that is the same as said retrieval statement concept have said document concept that is the same as a retrieval statement lower concept that is a lower layer of said retrieval statement concept, replaces said retrieval statement concept with the retrieval statement lower concept; and a specialized concept output section that outputs said document data in which said retrieval statement lower concept matches said document concept, as a retrieval result.

8. The retrieval system according to claim 1, wherein: said concept database stores said plurality of concepts that identify a plurality of defects in a product, said document database stores said document data indicating contents of each of said defects, said retrieval statement concept extracting section extracts said retrieval statement concept and corresponding to said retrieval statement used to retrieve said defects in said product, and said retrieval result outputting section outputs said document data retrieved by said concept retrieving section, as said document data indicating the contents of said defects in said product inputted by said user.

9. The retrieval system according to claim 1, wherein: said concept database stores said plurality of concepts in a lower layer of said concept indicating that there are defects in components of the said product, using a hierarchical structure in which said concepts indicating states of the defects in the components are provided, said document data concept extracting section extracts said document concept indicating that there is a defect in one of said components, on the basis of the keyword contained in said document data, said retrieval statement concept extracting section extracts said retrieval statement concept indicating the state of the defect in said one of said components, on the basis of the keyword contained in said retrieval statement, and said concept retrieving section comprises: a higher concept acquiring section that acquires a retrieval statement higher concept that is said concept indicating that there is the defect in said one of said components, the concept being a higher layer of said retrieval statement concept; and a generalized concept outputting section that outputs, as a retrieval result, said document data having said document concept indicating that there is the defect in said one of said components, the document concept matching said retrieval statement higher concept.

10. The retrieval system according to claim 9, further comprising a component database that uses a hierarchical structure to store inclusive relationships among the components of said product, wherein said document data concept extracting section further extracts said document concept indicating said component described in said document data, on the basis of the keyword contained in said document data, said retrieval statement concept extracting section further extracts said retrieval statement concept indicating said component described in said retrieval statement concept extracting section, on the basis of the keyword contained in said retrieval statement, said higher concept acquiring section acquires said concept that is a higher layer of said first retrieval statement concept indicating that there is the defect in said component or a state of the defect in said component, and said concept that is a higher layer of said second retrieval statement concept indicating said component, and said generalized concept outputting section outputs, as a retrieval result, said document data having said document concept that matches said first retrieval statement concept and said document concept that matches said second retrieval statement concept if at least one of said first retrieval statement concept and said second retrieval statement concept is said concept in the higher layer.

11. The retrieval system according to claim 9, further comprising a product database that uses a hierarchical structure to store inclusive relationships among the names of a plurality of said products, wherein said document data concept extracting section further extracts said document concept indicating said product name described in said document data, on the basis of the keyword contained in said document data, said retrieval statement concept extracting section further extracts said retrieval statement concept indicating said product name described in said retrieval statement concept extracting section, on the basis of the keyword contained in said retrieval statement, said higher concept acquiring section acquires said concept that is a higher layer of said first retrieval statement concept indicating that there is the defect in said component or a state of the defect in said component, and said concept that is a higher layer of said second retrieval statement concept indicating said product name, and said generalized concept outputting section outputs, as a retrieval result, said document data having said document concept that matches said first retrieval statement concept and said document concept that matches said second retrieval statement concept if at least one of said first retrieval statement concept and said second retrieval statement concept is said concept in the higher layer.

12. A computer program product comprising a computer usable storage medium having computer readable program code means embodied therein for causing functions of a retrieval system, the computer readable program code means in said computer program product comprising computer readable program code means for causing a computer to effect the functions of claim 1.

13. A reporting system tangibly embodied on a computer readable media, comprising:
  a document database that sequentially stores inputted document data;
  a concept database that stores a plurality of pre-specified concepts using a hierarchical structure in which a first concept including a second concept is a higher layer of the second concept;
  a document data concept extracting section that extracts document concepts on the basis of keywords contained in said respective document data, the document concepts being said concepts corresponding to the document data;
  a concept ratio calculating section that calculates a ratio of the number of said document data corresponding to each of said concepts to the number of said document data in said document database;
  a relative frequency calculating section that calculates a relative frequency indicating the magnitude of the ratio calculated by said concept ratio calculating section with respect to a reference ratio corresponding to each of said concepts;
  a frequent concept selecting section that selects said concepts in which said relative frequency is at least a pre-specified threshold among said plurality of concepts;
  a preferred concept selecting section that selects one of a first concept selected by said frequent concept selection section and a second concept corresponding to a higher layer of said first concept, on the basis of the relative frequencies of said first and second concepts;
  a reporting section that reports to a user that said concept of said first concept or said second concept selected by said preferred concept selecting section has a higher relative frequency; and
  a concept extraction rule database that stores concept extraction rules comprising sets of one or more of the keywords and the concept indicating meanings of the one or more keywords,
wherein the retrieval statement concept extracting section extracts the concept contained in the concept extraction rule as the retrieval statement concept if said retrieval statement comprises the one or more keywords contained in any of the concept extraction rules,
wherein the document data concept extracting section extracts the concept contained in the concept extraction rule and uses said concept as the document concept if said document data include the one or more keywords contained in any of the concept extraction rules, and
wherein the retrieval system further comprises;
a retrieval index database that stores, for each of the document data, an association between the document data and the document concept of the document data extracted by the document data concept extracting section, wherein the concept retrieving section outputs said document data corresponding to the document concept of said document concept stored in the retrieval index database before the retrieval statement is inputted;
a synonym database that stores an association between a predetermined word or phrase and the keyword that is a synonym of the word or phrase;
a document data normalizing section that normalizes the document data by replacing the word or phrase contained in each of said document data with the keyword that is the synonym of the word or phrase; and
a retrieval statement normalizing section that normalizes the retrieval statement by replacing the word or phrase contained in said retrieval statement with the keyword that is the synonym of the word or phrase,
wherein the document data concept extracting section extracts the document concept from the normalized document data, and the retrieval statement concept extracting section extracts the retrieval statement concept from the normalized retrieval statement;
wherein the concept retrieving section comprises;
a higher concept acquiring section that acquires a retrieval statement higher concept that is a higher-layer concept of said retrieval statement concept if the retrieval statement concept does not match the document concept; and
a generalized concept output section that outputs the document data as a retrieval result if the retrieval statement higher concept matches the document concept;
wherein:
the concept database stores each of said plurality of concepts as a node of the first or second hierarchical structure, the document data concept extracting section extracts the first document concept belonging to the first hierarchical structure and the second document concept belonging to the second hierarchical structure in association with the document data, the retrieval statement concept extracting section extracts the retrieval statement concept belonging to the first hierarchical structure and the second retrieval statement concept belonging to the second hierarchical structure in association with the retrieval statement, the higher concept acquiring section acquires the first retrieval statement higher concept that is a higher layer of the first retrieval statement concept and the second retrieval statement higher concept that is a higher layer of the second retrieval statement concept if the first retrieval statement concept does not match the first document concept and if the second retrieval statement concept does not match the second document concept, and the generalized concept output section outputs the first document data as a retrieval result if the number of the first document data in which the first retrieval statement higher concept is the same as the second retrieval statement concept and in which the first document concept is the same as the second document concept is smaller than that of the second document data in which the first retrieval statement higher concept is the same as the second retrieval statement concept and in which the first document concept is the same as the second document concept, or wherein the concept retrieving section comprises:

a lower concept acquiring section that, if all the document data having the document concept that is the same as the retrieval statement concept have the document concept that is the same as a retrieval statement lower concept that is a lower layer of the retrieval statement concept, replaces the retrieval statement concept with the retrieval statement lower concept and a specialized concept output section that outputs the document data in which the retrieval statement lower concept matches the document concept, as a retrieval unit and wherein;

the concept database stores the plurality of concepts that identify a plurality of defects in a product, the document database stores the document data indicating contents of each of the plurality of defects, the retrieval statement concept extracting section extracts the retrieval statement concept corresponding to the retrieval statement used to retrieve said defects in the product, and the retrieval result outputting section outputs the document data retrieved by the concept retrieving section, as said document data indicating the contents of the defects in the product inputted by a user; or wherein;

the concept database stores the plurality of concepts in a lower layer of the concept indicating that there are defects in components of the product, using a hierarchical structure in which the concepts indicating states of the defects in the components are provided, the document data concept extracting section extracts the document concept indicating that there is a defect in one of the components, on the basis of the keyword contained in the document data, the retrieval statement concept extracting section extracts the retrieval statement concept indicating the state of the defect in the one of said components, on the basis of the keyword contained in the retrieval statement, and wherein the concept retrieving section comprises:

a higher concept acquiring section that acquires a retrieval statement higher concept that is the concept indicating that there is the defect in the one of said components, the concept being a higher layer of the retrieval statement concept; and a generalized concept outputting section that outputs, as a retrieval result, the document data having the document concept indicating that there is the defect in the one of the components, the document concept matching the retrieval statement higher concept; and further comprising a component database that uses a hierarchical structure to store inclusive relationships among the components of the product, wherein;

the document data concept extracting section further extracts the document concept indicating the component described in the document data, on the basis of the keyword contained in the document data, the retrieval statement concept extracting section further extracts the retrieval statement concept indicating the component described in the retrieval statement concept extracting section, on the basis of the keyword contained in the retrieval statement, the higher concept acquiring section acquires the concept that is a higher layer of the first retrieval statement concept indicating that there is the defect in the component or a state of the defect in the component, and the concept that is a higher layer of the second retrieval statement concept indicating the component, and the generalized concept outputting section outputs, as a retrieval result, the document data having the document concept that matches the first retrieval statement concept and the document concept that matches the second retrieval statement concept if at least one of the first retrieval statement concept and the second retrieval statement concept is the concept in the higher layer;

or a product database that uses a hierarchical structure to store inclusive relationships among the names of a plurality of the products, wherein the document data concept extracting section further extracts the document concept indicating the product name described in the document data, on the basis of the keyword contained in said document data, the retrieval statement concept extracting section further extracts the retrieval statement concept indicating the product name described in the retrieval statement concept extracting section, on the basis of the keyword contained in the retrieval statement, the higher concept acquiring section acquires the concept that is a higher layer of the first retrieval statement concept indicating that there is the defect in the component or a state of the defect in the component, and the concept that is a higher layer of the second retrieval statement concept indicating the product name, and the generalized concept outputting section outputs, as a retrieval result, the document data having the document concept that matches the first retrieval statement concept and the document concept that matches the second retrieval statement concept if at least one of the first retrieval statement concept and the second retrieval statement concept is the concept in the higher layer.

14. The reporting system according to claim 13, wherein said document database stores document data indicating the contents of defects in each of a plurality of products, said concept database stores said plurality of concepts identifying a plurality of defects in the products, said document data concept extracting section extracts the document concepts that are said concepts corresponding to the document data, on the basis of the keywords contained in said respective document data, and said concept ratio calculating section comprises:

an all-product concept ratio calculating section that calculates, for said plurality of products, a ratio between the number of said document data and the number of said document data corresponding to said respective concepts; and a particular-product concept ratio calculating section that calculates a ratio between the number of said document data for at least one of said products and the number of said document data for the products corresponding to said respective concepts, said relative frequency calculating section calculates said relative frequency indicating the magnitude of ratio between the ratio calculated by said all-product concept ratio calculating section and the ratio calculated by said particular-product concept ratio calculating section, said frequent concept selecting section selects one of said plurality of concepts for which said relative frequency for said at least one product is at least said pre-specified threshold, said preferred concept selecting section selects one of said first concept selected by said frequent concept selecting section and said second concept corresponding to the higher layer of said first concept, on the basis of the relative frequencies of said first and second concepts, and said reporting section that reports to a user of the retrieval system that a defect corresponding to said first or second concept selected by said preferred concept selecting section has frequently occurred in said at least one product.

15. The reporting system according to claim 13, wherein said preferred concept selecting section selects said first concept if the relative frequency of said first concept is higher than the relative frequency of said second concept by at least a pre-specified rate, and selects said second concept if the relative frequency of said first concept is not higher than the relative frequency of said second concept by at least said pre-specified rate.

16. The reporting system according to claim 13, wherein said concept database stores concept database stores each of said plurality of concepts as a node of said first or second hierarchical structure, said document data concept extracting section extracts said first document concept belonging to said first hierarchical structure and said second document concept belonging to said second hierarchical structure in association with said document data, said concept ratio calculating section calculates a first ratio between the number of said document data in said document database and the number of said document data corresponding to said concepts in said first hierarchical structure, a second ratio between the number of said document data in said document database and the number of said document data corresponding to said concepts in said second hierarchical structure, and a third ratio between the number of said document data in said document database and the number of said document data corresponding to a combination of said concepts in said first hierarchical structure and said concepts in said second hierarchical structure, said relative frequency calculating section calculates a first relative frequency indicating the magnitude of said first ratio with respect to a reference ratio corresponding to said concepts in said first hierarchical structure, a second relative frequency indicating the magnitude of said second ratio with respect to a reference ratio corresponding to said concepts in said second hierarchical structure, and a third relative frequency indicating the magnitude of said third ratio with respect to a reference ratio corresponding to a combination of said concepts in said first hierarchical structure and said concepts in said second hierarchical structure, said frequent concept selecting section selects, from the combination of said concepts in said first hierarchical structure and said concepts in said second hierarchical structure, a set of a third concept in said first hierarchical structure and a fourth concept in said second hierarchical structure for which said relative frequency is at least said threshold, the reporting system further comprises a reference frequency calculating section that finds a calculated value for said third relative frequency which is obtained if said third concept and fourth concept are independent events, on the basis of said first relative frequency for said third concept and said second relative frequency for said fourth concept, said preferred concept selecting section selects the combination of said third concept and said fourth concept if said third relative frequency is higher than the calculated value for said third relative frequency by at least a pre-specified rate, the calculated value being obtained if said third concept and fourth concept are independent events, the preferred concept selecting section selecting said third concept if said third relative frequency is not higher than the calculated value for said third relative frequency by at least said pre-specified rate, and said reporting section reports to the user that the combination of said third concept and said fourth concept selected by said preferred concept selecting section, or said third concept has an increased relative frequency.

17. A computer program product comprising a computer usable storage medium having computer readable program code means embodied therein for causing functions of a reporting system, the computer readable program code means in said computer program product comprising computer readable program code means for causing a computer to effect the functions of claim 13.

18. A retrieval method executed by a retrieval system for retrieving document data having a content specified by an inputted retrieval statement from a plurality of document data, the method comprising:

storing in a storage device said plurality of document data;

storing in the storage device a plurality of pre-specified concepts using a hierarchical structure in which a first concept including a second concept is a higher layer of the second concept;

using a processor for extracting document concepts on the basis of keywords contained in the respective document data, the document concepts being concepts corresponding to the document data;

using the processor for extracting a retrieval statement concept on the basis of a keyword contained in the retrieval statement, the retrieval statement concept being the concept corresponding to said retrieval statement;

using the processor for retrieving document data in which the retrieval statement concept is a higher or lower layer of the document concept among said plurality of document data;

using the processor for outputting the document data retrieved by the concept retrieving section, as said document data containing the content specified by the retrieval statement; and storing in the storage device concept extraction rules comprising sets of one or more of the keywords and the concept indicating meanings of the one or more keywords, the concept contained in the concept extraction rule as the retrieval statement concept if said retrieval statement comprises the one or more keywords contained in any of the concept extraction rules, extracting the concept contained in the concept extraction rule and using said concept as the document concept if said document data include the one or more keywords contained in any of the concept extraction rules, and wherein the method further comprises:

storing in the storage device, for each of the document data, an association between the document data and the document concept of the document data extracted by the document data concept extracting section, outputting said document data corresponding to the document concept of said document concept stored in the retrieval index database before the retrieval statement is inputted;

using a synonym database for storing an association between a predetermined word or phrase and the keyword that is a synonym of the word or phrase;

using a document data normalizing section for normalizing the document data by replacing the word or phrase contained in each of said document data with the keyword that is the synonym of the word or phrase; and using a retrieval statement normalizing section that normalizes the retrieval statement by replacing the word or phrase contained in said retrieval statement with the keyword that is the synonym of the word or phrase, wherein the document data concept extracting step extracts the document concept from the normalized document data, and the retrieval statement concept extracting section extracts the retrieval statement concept from the normalized retrieval statement wherein the concept retrieving step comprises:

a higher concept acquiring step that acquires a retrieval statement higher concept that is a higher-layer concept of said retrieval statement concept if the retrieval statement concept does not match the document concept and a generalized concept output step that outputs the document data as a retrieval result if the retrieval statement higher concept matches the document concept;

wherein:

the concept database stores each of said plurality of concepts as a node of the first or second hierarchical structure, the document data concept extracting step extracts the first document concept belonging to the first hierarchical structure and the second document concept belonging to the second hierarchical structure in association with the document data, the retrieval statement concept extracting step extracts the retrieval statement concept belonging to the first hierarchical structure and the second retrieval statement concept belonging to the second hierarchical structure in association with the retrieval statement, the higher concept acquiring step acquires the first retrieval statement higher concept that is a higher layer of the first retrieval statement concept and the second retrieval statement higher concept that is a higher layer of the second retrieval statement concept if the first retrieval statement concept does not match the first document concept and if the second retrieval statement concept does not match the second document concept, and the generalized concept output step outputs the first document data as a retrieval result if the number of the first document data in which the first retrieval statement higher concept is the same as the second retrieval statement concept and in which the first document concept is the same as the second document concept is smaller than that of the second document data in which the first retrieval statement higher concept is the same as the second retrieval statement concept and in which the first document concept is the same as the second document concept, or wherein the concept retrieving step comprises:

a lower concept acquiring step that, if all the document data having the document concept that is the same as the retrieval statement concept have the document concept that is the same as a retrieval statement lower concept that is a lower layer of the retrieval statement concept, replaces the retrieval statement concept with the retrieval statement lower concept and a specialized concept output step that outputs the document data in which the retrieval statement lower concept matches the document concept, as a retrieval unit and wherein:

the concept database stores the plurality of concepts that identify a plurality of defects in a product, the document database stores the document data indicating contents of each of the plurality of defects, the retrieval statement concept extracting step extracts the retrieval statement concept corresponding to the retrieval statement used to retrieve said defects in the product, and the retrieval result outputting step outputs the document data retrieved by the concept retrieving section, as said document data indicating the contents of the defects in the product inputted by a user; or wherein:

the concept database stores the plurality of concepts in a lower layer of the concept indicating that there are defects in components of the product, using a hierarchical structure in which the concepts indicating states of the defects in the components are provided, the document data concept extracting step extracts the document concept indicating that there is a defect in one of the components, on the basis of the keyword contained in the document data, the retrieval statement concept extracting step extracts the retrieval statement concept indicating the state of the defect in the one of said components, on the basis of the keyword contained in the retrieval statement, and wherein the concept retrieving step comprises:

a higher concept acquiring step that acquires a retrieval statement higher concept that is the concept indicating that there is the defect in the one of said components, the concept being a higher layer of the retrieval statement concept and a generalized concept outputting step that outputs, as a retrieval result, the document data having the document concept indicating that there is the defect in the one of the components, the document concept matching the retrieval statement higher concept and further comprising a component database that uses a hierarchical structure to store inclusive relationships among the components of the product, wherein:

the document data concept extracting step further extracts the document concept indicating the component described in the document data, on the basis of the keyword contained in the document data, the retrieval statement concept extracting step further extracts the retrieval statement concept indicating the component described in the retrieval statement concept extracting step, on the basis of the keyword contained in the retrieval statement, the higher concept acquiring step acquires the concept that is a higher layer of the first retrieval statement concept indicating that there is the defect in the component or a state of the defect in the component, and the concept that is a higher layer of the second retrieval statement concept indicating the component, and the generalized concept outputting step outputs, as a retrieval result, the document data having the document concept that matches the first retrieval statement concept and the document concept that matches the second retrieval statement concept if at least one of the first retrieval statement concept and the second retrieval statement concept is the concept in the higher layer; or a product database that uses a hierarchical structure to store inclusive relationships among the names of a plurality of the products, wherein the document data concept extracting section further extracts the document concept indicating the product name described in the document data, on the basis of the keyword contained in said document data, the retrieval statement concept extracting section further extracts the retrieval statement concept indicating the product name described in the retrieval statement concept extracting step, on the basis of the keyword contained in the retrieval statement, the higher concept acquiring step acquires the concept that is a higher layer of the first retrieval statement concept indicating that there is the defect in the component or a state of the defect in the component, and the concept that is a higher layer of the second retrieval statement concept indicating the product name, and the generalized concept outputting step outputs, as a retrieval result, the document data having the document concept that matches the first retrieval statement concept and the document concept that matches the second retrieval statement concept if at least one of the first retrieval statement concept and the second retrieval statement concept is the concept in the higher layer.

19. An article of manufacture comprising a computer usable storage medium having computer readable program code means embodied therein for causing retrieval, the computer readable program code means in said article of manufacture comprising computer readable program code means for causing a computer to effect the steps of claim 18.

20. A reporting method tangibly embodied on computer readable storage media in a reporting system to which a plurality of document data is sequentially inputted, the method comprising:

a document database storing step of sequentially storing inputted document data;

a concept database storing step of storing a plurality of pre-specified concepts using a hierarchical structure in which a first concept including a second concept is a higher layer of the second concept;

a document data concept extracting step of extracting document concepts on the basis of keywords contained in said respective document data, the document concepts being said concepts corresponding to the document data;

a concept ratio calculating step of calculating a ratio of the number of said document data corresponding to each of said concepts to the number of said document data stored in said document database storing step;

a relative frequency calculating step of calculating a relative frequency indicating the magnitude of the ratio calculated in said concept ratio calculating step with respect to a reference ratio corresponding to each of said concepts;

a frequent concept selecting step of selecting said concepts in which said relative frequency is at least a pre-specified threshold among said plurality of concepts;

a preferred concept selecting step of selecting one of a first concept selected by said frequent concept selection section and a second concept corresponding to a higher layer of said first concept, on the basis of the relative frequencies of said first and second concepts;

a reporting step of reporting to a user that said concept of said first concept or said second concept selected by said preferred concept selecting section has a higher relative frequency; and storing concept extraction rules comprising sets of one or more of the keywords and the concept indicating meanings of the one or more keywords, wherein the retrieval statement concept extracting step extracts the concept contained in the concept extraction rule as the retrieval statement concept if said retrieval statement comprises the one or more keywords contained in any of the concept extraction rules, wherein the document data concept extracting step extracts the concept contained in the concept extraction rule and uses said concept as the document concept if said document data include the one or more keywords contained in any of the concept extraction rules, and wherein the retrieval method further comprises:

a retrieval index database step for storing, for each of the document data, an association between the document data and the document concept of the document data extracted by the document data concept extracting section, wherein the concept retrieving section outputs said document data corresponding to the document concept of said document concept stored in the retrieval index database before the retrieval statement is inputted;

a synonym database step that stores an association between a predetermined word or phrase and the keyword that is a synonym of the word or phrase;

a document data normalizing step that normalizes the document data by replacing the word or phrase contained in each of said document data with the keyword that is the synonym of the word or phrase; and a retrieval statement normalizing step that normalizes the retrieval statement by replacing the word or phrase contained in said retrieval statement with the keyword that is the synonym of the word or phrase, wherein the document data concept extracting step extracts the document concept from the normalized document data, and the retrieval statement concept extracting step extracts the retrieval statement concept from the normalized retrieval statement;

wherein the concept retrieving section comprises:

a higher concept acquiring step that acquires a retrieval statement higher concept that is a higher-layer concept of said retrieval statement concept if the retrieval statement concept does not match the document concept; and a generalized concept output step that outputs the document data as a retrieval result if the retrieval statement higher concept matches the document concept wherein:
the concept database stores each of said plurality of concepts as a node of the first or second hierarchical structure,
the document data concept extracting step that extracts the first document concept belonging to the first hierarchical structure and the second document concept belonging to the second hierarchical structure in association with the document data,
the retrieval statement concept extracting step that extracts the retrieval statement concept belonging to the first hierarchical structure and the second retrieval statement concept belonging to the second hierarchical structure in association with the retrieval statement,
the higher concept acquiring step that acquires the first retrieval statement higher concept that is a higher layer of the first retrieval statement concept and the second retrieval statement higher concept that is a higher layer of the second retrieval statement concept if the first retrieval statement concept does not match the first document concept and if the second retrieval statement concept does not match the second document concept, and
the generalized concept output step that outputs the first document data as a retrieval result if the number of the first document data in which the first retrieval statement higher concept is the same as the second retrieval statement concept and in which the first document concept is the same as the second document concept is smaller than that of the second document data in which the first retrieval statement higher concept is the same as the second retrieval statement concept and in which the first document concept is the same as the second document concept, or
wherein the concept retrieving step comprises:
a lower concept acquiring step that, if all the document data having the document concept that is the same as the retrieval statement concept have the document concept that is the same as a retrieval statement lower concept that is a lower layer of the retrieval statement concept, replaces the retrieval statement concept with the retrieval statement lower concept and
a specialized concept output step that outputs the document data in which the retrieval statement lower concept matches the document concept, as a retrieval unit and wherein:
the concept database stores the plurality of concepts that identify a plurality of defects in a product,
the document database stores the document data indicating contents of each of the plurality of defects,
the retrieval statement concept extracting step extracts the retrieval statement concept corresponding to the retrieval statement used to retrieve said defects in the product, and the retrieval result outputting step outputs the document data retrieved by the concept retrieving step, as said document data indicating the contents of the defects in the product inputted by a user; or
wherein:
the concept database stores the plurality of concepts in a lower layer of the concept indicating that there are defects in components of the product, using a hierarchical structure in which the concepts indicating states of the defects in the components are provided,
the document data concept extracting step extracts the document concept indicating that there is a defect in one of the components, on the basis of the keyword contained in the document data,
the retrieval statement concept extracting step extracts the retrieval statement concept indicating the state of the defect in the one of said components, on the basis of the keyword contained in the retrieval statement, and
wherein the concept retrieving step comprises:
a higher concept acquiring step that acquires a retrieval statement higher concept that is the concept indicating that there is the defect in the one of said components, the concept being a higher layer of the retrieval statement concept and
a generalized concept outputting step that outputs, as a retrieval result, the document data having the document concept indicating that there is the defect in the one of the components, the document concept matching the retrieval statement higher concept; and further comprising a component database that uses a hierarchical structure to store inclusive relationships among the components of the product,
wherein:
the document data concept extracting step further extracts the document concept indicating the component described in the document data, on the basis of the keyword contained in the document data,
the retrieval statement concept extracting step further extracts the retrieval statement concept indicating the component described in the retrieval statement concept extracting step, on the basis of the keyword contained in the retrieval statement,
the higher concept acquiring step acquires the concept that is a higher layer of the first retrieval statement concept indicating that there is the defect in the component or a state of the defect in the component, and the concept that is a higher layer of the second retrieval statement concept indicating the component, and
the generalized concept outputting step outputs, as a retrieval result, the document data having the document concept that matches the first retrieval statement concept and the document concept that matches the second retrieval statement concept if at least one of the first retrieval statement concept and the second retrieval statement concept is the concept in the higher layer or
a product database that uses a hierarchical structure to store inclusive relationships among the names of a plurality of the products,
wherein the document data concept extracting step further extracts the document concept indicating the product name described in the document data, on the basis of the keyword contained in said document data,
the retrieval statement concept extracting step further extracts the retrieval statement concept indicating the product name described in the retrieval statement concept extracting step, on the basis of the keyword contained in the retrieval statement,
the higher concept acquiring step acquires the concept that is a higher layer of the first retrieval statement concept indicating that there is the defect in the component or a state of the defect in the component, and the concept that is a higher layer of the second retrieval statement concept indicating the product name, and
the generalized concept outputting step outputs, as a retrieval result, the document data having the document concept that matches the first retrieval statement concept and the document concept that matches the second retrieval statement concept if at least one of the first retrieval statement concept and the second retrieval statement concept is the concept in the higher layer.

21. An article of manufacture comprising a computer usable storage medium having computer readable program code means embodied therein for causing reporting, the computer readable program code means in said article of manufacture comprising computer readable program code means for causing a computer to effect the steps of claim 18.

* * * * *